United States Patent
Rabung et al.

(10) Patent No.: US 6,654,748 B1
(45) Date of Patent: Nov. 25, 2003

(54) DYNAMIC APPLICATION BROWSER AND DATABASE FOR USE THEREWITH

(75) Inventors: Adam J. Rabung, Richmond, VA (US); Michael H. Schrag, Richmond, VA (US)

(73) Assignee: RWD Technologies, Inc., Columbia, MD (US)

( * ) Notice: Subject to any disclaimer, the term of this patent is extended or adjusted under 35 U.S.C. 154(b) by 0 days.

(21) Appl. No.: 09/456,378

(22) Filed: Dec. 7, 1999

(51) Int. Cl.[7] .......................... G06F 17/30; G06F 15/16
(52) U.S. Cl. ................. 707/10; 707/103 R; 707/104.1; 709/217; 709/218
(58) Field of Search .................... 707/10, 103, 104, 707/103 R, 104.1; 709/217, 218

(56) References Cited

U.S. PATENT DOCUMENTS

| | | |
|---|---|---|
| 4,012,848 A | 3/1977 | Diament et al. |
| 4,274,139 A | 6/1981 | Hodgkinson et al. |
| 4,360,345 A | 11/1982 | Hon |
| 4,464,118 A | 8/1984 | Scott et al. |
| 4,538,993 A | 9/1985 | Krumholz |
| 4,586,905 A | 5/1986 | Groff |
| 4,609,358 A | 9/1986 | Sangster |
| 4,689,022 A | 8/1987 | Peers et al. |
| 4,724,521 A | 2/1988 | Carron et al. |
| 4,754,395 A | 6/1988 | Weisshaar et al. |
| 4,820,167 A | 4/1989 | Nobles et al. |
| 4,895,518 A | 1/1990 | Arnold et al. |
| 4,935,870 A | 6/1990 | Burk, Jr. et al. |
| 4,985,697 A | 1/1991 | Boulton |
| 5,035,625 A | 7/1991 | Munson et al. |
| 5,174,759 A | 12/1992 | Preston et al. |
| 5,183,398 A | 2/1993 | Monte et al. |
| 5,259,766 A | 11/1993 | Sack et al. |
| 5,263,869 A | 11/1993 | Ziv-El |
| 5,267,865 A | 12/1993 | Lee et al. |
| 5,276,883 A | 1/1994 | Halliwell |
| 5,302,132 A | 4/1994 | Corder |
| 5,303,042 A | 4/1994 | Lewis et al. |
| 5,306,154 A | 4/1994 | Ujita et al. |
| 5,387,104 A | 2/1995 | Corder |
| 5,424,945 A | 6/1995 | Bell |
| 5,437,555 A | 8/1995 | Ziv-El |
| 5,441,415 A | 8/1995 | Lee et al. |
| 5,442,759 A | 8/1995 | Chiang et al. |
| 5,454,722 A | 10/1995 | Holland et al. |
| 5,466,159 A | 11/1995 | Clark et al. |
| 5,473,537 A | 12/1995 | Glazer et al. |
| 5,564,043 A | 10/1996 | Siefert |
| 5,577,251 A | 11/1996 | Hamilton et al. |
| 5,581,764 A | 12/1996 | Fitzgerald et al. |
| 5,583,563 A | 12/1996 | Wanderscheid et al. |
| 5,590,360 A | 12/1996 | Edwards |
| 5,597,312 A | 1/1997 | Bloom et al. |

(List continued on next page.)

OTHER PUBLICATIONS

Wolfgang Pree, "Design Patterns for Object–Oriented Software Development," Addison–Wesley, pp. 69–70, 1995.

Frank Buschmann et al., "Pattern–Oriented Software Architecture A System of Patterns," John Wiley & Sons, pp. 125–143, 1996.

Primary Examiner—Frantz Coby
(74) Attorney, Agent, or Firm—Piper Rudnick LLP

(57) ABSTRACT

A dynamic application browser is provided that handles multiple applications and allows for the seamless exchange of information from one computer to another is described. The dynamic application browser is run on a first computer including a database that stores a plurality of objects. The browser also includes an update module that uploads and downloads objects from a second computer and a database manager. The database manager controls storage of, and access to, the objects stored in the at least one database and interfaces with the update module and the at least one database. The at least one database includes at least one table storing at least one of the plurality of objects.

23 Claims, 44 Drawing Sheets

U.S. PATENT DOCUMENTS

| | | |
|---|---|---|
| 5,619,991 A | 4/1997 | Sloane |
| 5,684,956 A | 11/1997 | Billings |
| 5,689,671 A | 11/1997 | Strömberg |
| 5,692,129 A | 11/1997 | Sonderegger et al. |
| 5,692,906 A | 12/1997 | Corder |
| 5,696,981 A | 12/1997 | Shovers |
| 5,711,671 A | 1/1998 | Geeslin et al. |
| 5,721,906 A | 2/1998 | Siefert |
| 5,722,418 A | 3/1998 | Bro |
| 5,727,950 A | 3/1998 | Cook et al. |
| 5,727,951 A | 3/1998 | Ho et al. |
| 5,754,746 A | 5/1998 | Blurfrushan et al. |
| 5,779,486 A | 7/1998 | Ho et al. |
| 5,802,530 A | 9/1998 | Van Hoff |
| 5,805,829 A | 9/1998 | Cohen et al. |
| 5,813,863 A | 9/1998 | Sloane et al. |
| 5,823,788 A | 10/1998 | Lemelson et al. |
| 5,828,840 A | 10/1998 | Cowan et al. |
| 5,836,304 A | 11/1998 | Kellinger et al. |
| 5,845,090 A | 12/1998 | Collins, III et al. |
| 5,859,978 A | 1/1999 | Sonderegger et al. |
| 5,870,558 A | 2/1999 | Branton, Jr. et al. |
| 5,870,719 A | 2/1999 | Maritzen et al. |
| 5,879,163 A | 3/1999 | Brown et al. |
| 5,892,905 A * | 4/1999 | Brandt et al. .......... 395/187.01 |
| 5,904,485 A | 5/1999 | Siefert |
| 5,909,684 A | 6/1999 | Nelson |
| 5,927,988 A | 7/1999 | Jenkins et al. |
| 5,957,699 A | 9/1999 | Peterson et al. |
| 5,980,429 A | 11/1999 | Nashner |
| 5,987,149 A | 11/1999 | Poor |
| 5,991,693 A | 11/1999 | Zalewski |
| 6,026,403 A | 2/2000 | Siefert |
| 6,341,316 B1 | 1/2002 | Kloba et al. |

* cited by examiner

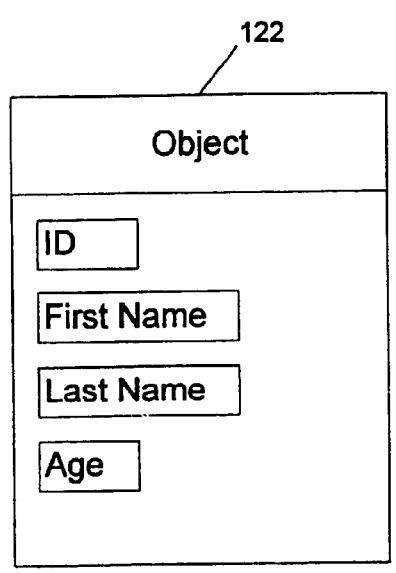
FIG.1D
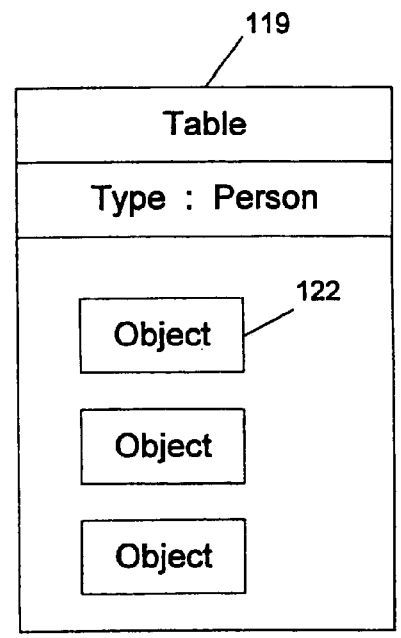
FIG.1E
| Last Name Index ||
|---|---|
| Last Name | OBJ ID |
| Brown | 2 |
| Jones | 3 |
| Smith | 1 |
FIG.1F
| First Name Index ||
|---|---|
| First Name | OBJ ID |
| John | 3 |
| Mark | 1, 2 |
FIG.1G

| File Glossary | |
|---|---|
| Symbolic Name | File Name |
| Sample database | |
| Sample database—Person Table | c:\myapp\database\gzlext2 |
| Sample database—Person Table—Data | c:\myapp\database\gzlext3 |
| Sample database—Person Table—Data—File map | c:\myapp\database\gzlext4 |
| Sample database—Person Table—Data—RAF | c:\myapp\database\gzlext5 |
| Sample database—Person Table—Index—Last name | c:\myapp\database\gzlext6 |
| | c:\myapp\database\gzlext7 |

FIG.1H

| Table File | |
|---|---|
| Field | Value |
| Base class name | Person.class |
| Store handle | Sample database~Person Table~Store |
| Cache Policy | MEDIUM_CACHING |
| Number of indices | 1 |
| Symbolic Name of index #1 | Sample database~Person Table~Index~Last name |

FIG.1I

| Data File | Stores info about a particular store |
|---|---|
| Field | Value |
| RAF Symbolic Name | Sample database~Person Table~Data~RAF |
| File Map Symbolic Name | Sample database~Person Table~Data~File map |

FIG.1J

| File map | |
|---|---|
| Field | Value |
| File map | \<Data structure mapping object ID to file offset\> |
| End of file pointer | \<Length of file in bytes\> |
| Total store size | \<Total number of bytes in the file dedicated to storing objects\> |
| Total number of live objects in store | \<Total number of objects\> |

FIG.1K

| Index file | |
|---|---|
| Field | Value |
| Base class | String |
| Index Structure | \<Data structure mapping index values to object IDs\> |
| Is this a unique index? | False |

Profile/Registration (*= required)
Company Name* | Experiment Technologies, LLC
Name* | John Doe
Position* | Regional Manager
Address* | 123 Main St.
City* | Anytown
State* | Anystate
Zipcode* | 12345
Rep ID #* | 12345
Territory ID #* | 123

End Profile

17830

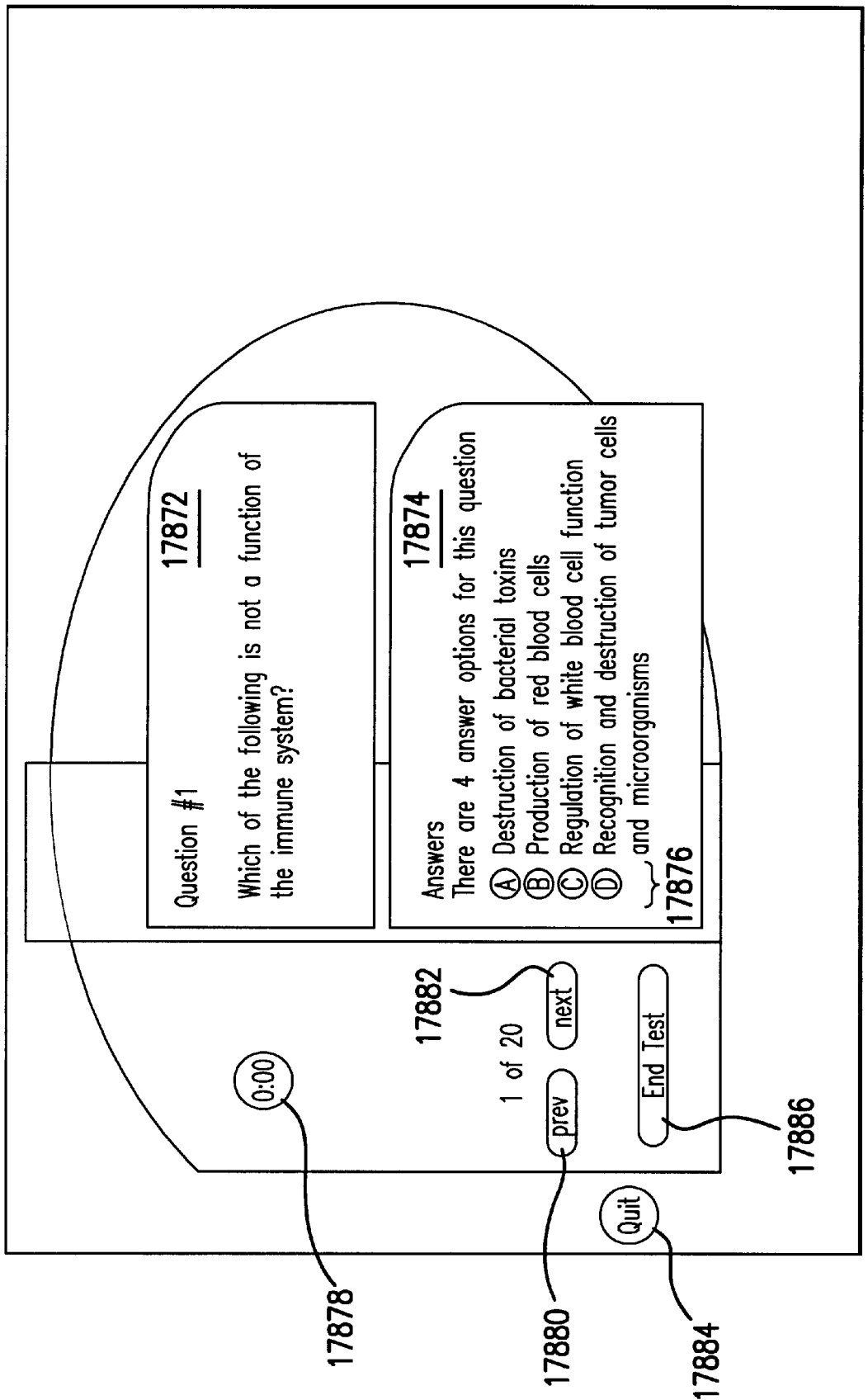

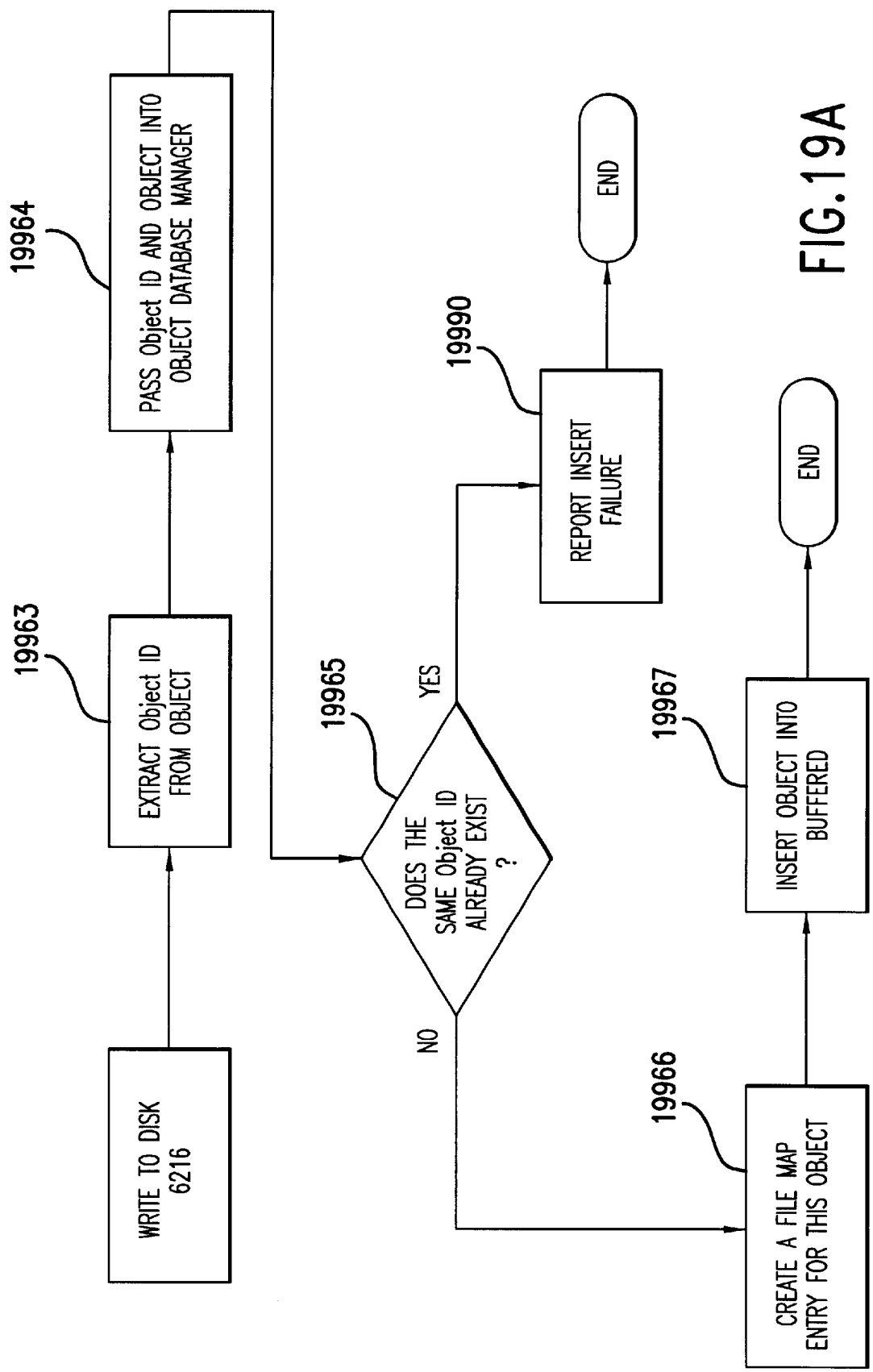

DYNAMIC APPLICATION BROWSER AND DATABASE FOR USE THEREWITH

COMPUTER PROGRAM LISTING APPENDIX

Two duplicate CD-ROMs ("Copy 1" and "Copy 2") containing a Computer Program Listing Appendix are submitted herewith. Each CD-ROM contains one 43,915 KB file of computer program code according to an embodiment of the present invention, is named "code.PDF" and is in Adobe® Acrobat® portable document format (PDF). The Computer Program Listing Appendix is incorporated herein by reference in its entirety.

BACKGROUND

The present invention relates generally to network computer systems, and more particularly to automatically updating of applications from one computer to another computer over a network.

Operating systems and Internet browsers are commonly used to allow a user to execute and/or read multiple applications and/or files. For example, a Microsoft® Windows® operating system allows a user to select an icon which represents an application. Upon selection of the icon, the application is run and the user is able to interface with the application. With respect to an Internet browser, such as Microsoft® Internet Explorer, a user enters an Internet address which translates to a unique machine on the Internet. The unique machine provides the user data which can be either viewed or run by the user.

One problem faced with operating systems and Internet browsers is the difficulty in updating individual modules of the operating systems and browsers. For example, to update a program on an operating system, the program (or a large amount of data) may need be deleted and a new program (or data) installed in its place. Alternatively, the old program may be completely overwritten by the new program. This process may require the user to actively participate in the updating of applications and files by having to manually replace existing applications and filed with new applications and files. In addition, this procedure can be time consuming, especially if only a minor change is to be made to the application.

Computer applications, such as operating systems, Internet browsers, and other user application, typically use graphical user interfaces. These graphical user interfaces are characterized by the presentation of information in windows, as well as user control by a pointing device such as a mouse. The operation of these graphical user interfaces in such an environment can be described as "select-then-operate," i.e., a user first selects an object from the interface and then indicates the desired operation for that object.

Graphical user interfaces built according to object oriented principles can be viewed as including three components: the model, the view, and the controller. The model-view-controller (MVC) concept originates from a Smalltalk class-library as described in *Design Patterns for Object-Oriented Software Development* written by Wolfgang Pree, Addison-Wesley, 1995 and *A System of Patterns* written by Frank Buschmann, et al., Chichester, West Sussex, John Wiley & Sons, 1996, the contents of which are incorporated herein by reference in their entireties. The model stores application-specific data, e.g., a text processing application stores text characters in the model, and a drawing application stores a description of different graphical shapes in the model. A view presents the model on a display, e.g., a screen. Any number of views might present the model in different ways, although each view accesses the information stored in the model. The controller handles input events, such as mouse interaction and key strokes of a keyboard. The controller can access the view, as well as the model, to make changes to both the model and the view.

Some applications that run on computers using the MVC approach are used as teaching utilities. In addition, other applications are used so that the user can participate in commerce over networks such as the Internet. These applications may require information to be sent from one computer to another. For example, in an educational training program, a user may need to download educational material from a server as well as inform the server of its progress with the educational material. With respect to electronic cominerce, a user may wish to execute a sale via keystrokes on his keyboard and have a message sent to a remote source so that an order for goods or services can be processed.

Therefore, there is a need in the art for an application which can allow a user to select multiple applications for execution, as well as allow a user to update applications without having to overwrite or delete the entire previous version of the application. In addition, there is a need for an application which can allow a user to communicate over a network without the need for a constant connection.

SUMMARY OF THE INVENTION

In an exemplary embodiment of the present invention, a method and a system that handles multiple applications and allows for the seamless exchange of information from one computer to another is described. An application browser is provided which is run on a first computer including at least one database that stores a plurality of objects; an update module that uploads and downloads objects from a second computer; and a database manager that controls storage of, and access to, the objects stored in the at least one database and interfaces with the update module and the at least one database, wherein the at least one database includes at least one table storing at least one of the plurality of objects.

BRIEF DESCRIPTION OF THE DRAWINGS

These and other features, aspects, and advantages of the present invention will be understood by reading this description in conjunction with the drawings in which:

FIG. 1D illustrates an exemplary object according to the present invention;

FIG. 1E illustrates an exemplary table according to the present invention;

FIGS. 1F–1G illustrate exemplary indices according to the present invention;

FIGS. 1H–1L illustrate an exemplary embodiment of the file structure of a database according to the present invention;

FIGS. 17A–17J illustrate an exemplary interactive educational system application module of the present invention;

FIGS. 19A–19C illustrate an exemplary embodiment of step 6216 of FIG. 6A.

DETAILED DESCRIPTION

The present invention may be embodied in a general purpose digital computer that is running a program or program segments stored on and originating from a computer readable or usable medium, such medium including but not limited to magnetic storage media ((e.g., ROM's, floppy disks, hard disks, etc.), optically readable media (e.g., CD-ROMS, DVDs, etc.) and carrier waves (e.g., transmissions over the Internet or Intranet). A functional program, code and code segments, used to implement the present invention can be derived by a skilled computer programmer from the description of the invention contained herein.

One embodiment of the present invention is presented in the Computer Program Listing Appendix and is described below with reference to the Java™ programming language developed by Sun Microsystems, Inc. While the code in the Computer Program Listing Appendix is presented as a continuous file, a skilled artisan will appreciate that in order to implement the code shown in the Computer Program Listing Appendix on a computer, it is necessary to divide the code into individual files, in accordance with Java™ conventions. Java™ is described, for example, in *Java™ Primer Plus* by Paul Tyma, Gabriel Torok, and Troy Downing, published by Waite Group Press™ in 1996, the content of which is incorporated herein by reference in its entirety. The Java™ implementation and description is provided as an exemplary embodiment and is not meant as a limitation of the scope of the invention. It is within the skill of the ordinary artisan to implement the features of the present invention using other programming techniques and programming languages.

The present invention may be implemented on a variety of computer systems (such as IBM®-compatible computers, workstations, etc.),equipped with an operating system, e.g., Microsoft® Windows® 95/98. A typical computer system of the type in which the present invention can be employed, is illustrated in schematic view form in FIGS. 1A and 1B.

Figure 1A:
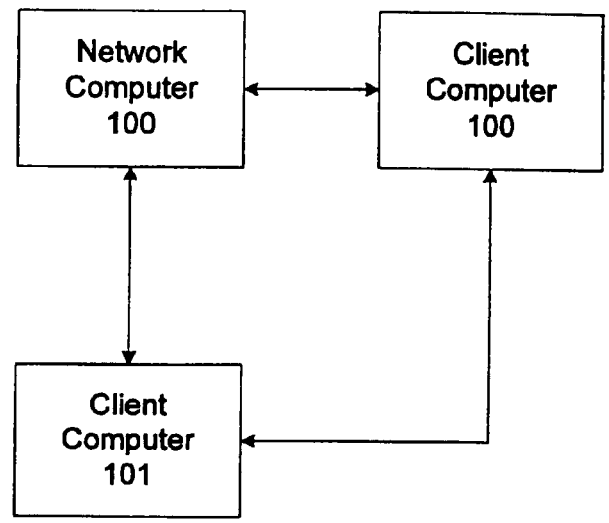
FIGS. 1A and 1B illustrate a typical computer system of the type in which the present invention can be employed.
Figure 1B:
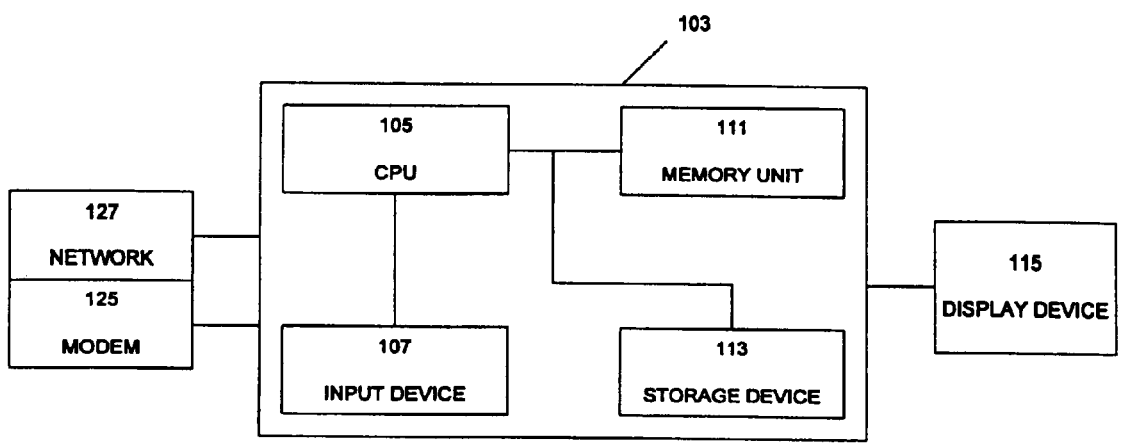

The structure of the computer system and that of the computers themselves in FIGS. 1A and 1B do not form part of the present invention. It is understood that modification of the structure of the computer system is within the skill of the ordinary artisan. For ease of reference, the client computer 101 on which the browser is running will sometimes be referred to as the local computer and the network computer 100, or any other client computer 101, to or from which data is to be sent or received will be referred to as a remote computer. This is briefly described here for subsequent understanding of the manner in which the features of the invention cooperate with the structure of the computers.

Referring to FIG. 1A, the present invention is designed to run on a computer system which includes at least one network computer 100 and at least one client computer 101. The client computer(s) 101 can communicate with each other or with the network computer 100. The network computer 100 may be part of a larger computer network or data service or may be a single network server.

Referring to FIG. 1B, computer 103 includes at least one central processing unit (CPU) 105 which is connected to at least one input device 107, e.g., a keyboard, mouse, touch pad, etc., at least one memory unit 111, e.g., RAM and/or ROM, and at least one storage device 113, e.g., a hard drive, floppy disk drive, writeable CD/DVD, EEPROM, etc.

Connected to the computer 103 is at least one display device 115, e.g., a monitor or a liquid crystal diode (LCD) display; a printer 123; a modem 125; and/or a network interface 127. The modem 125 or network interface 127 may be connected to a computer network or data service via a wire or wireless connection. In addition, the connection to a computer network or data service via the modem 125 and/or network interface 127 provides two-way communication.

In an exemplary embodiment of the present invention, data can be received by computer 103 via modem 125 or network interface 127, entered directly to the computer 103 via input device 107, or recalled from storage device 113. In addition, output of the present invention may be displayed on at least one display device 115, stored in the storage device 113, or sent to another computer via the modem 125 or the network interface 127.

For example, in one embodiment of the present invention, the system illustrated in FIGS. 1A and 1B is implemented in at least two computers. The two computers can have a client-server relationship or a peer-to-peer relationship. In addition, with respect to the client-server relationship, a server computer can connect to multiple clients, whereby each client can receive updates from the server and transmit data to the server via a dynamic application browser, according to the present invention. For example, if the client's dynamic application browser is running an educational application module, the dynamic application browser can receive education material, such as, lesson plans or exams from a server. In turn, statistical data, such as test scores and usage time, can be sent from the client to the server for evaluation. In addition, profile data or other user information can be sent from the client to the server for identification. Furthermore, using the exemplary methods and systems of the present invention, the client can send data to the server authorizing the purchase of additional lesson plans or additional application modules. In addition, the server can make changes to the application module being run on the client by updating individual Java™ objects and class files, without the need to replace the entire application module. Furthermore, the server can make changes (or updates) to the client's dynamic application browser using the same techniques as those modifying the individual application modules.

Figure 1C:
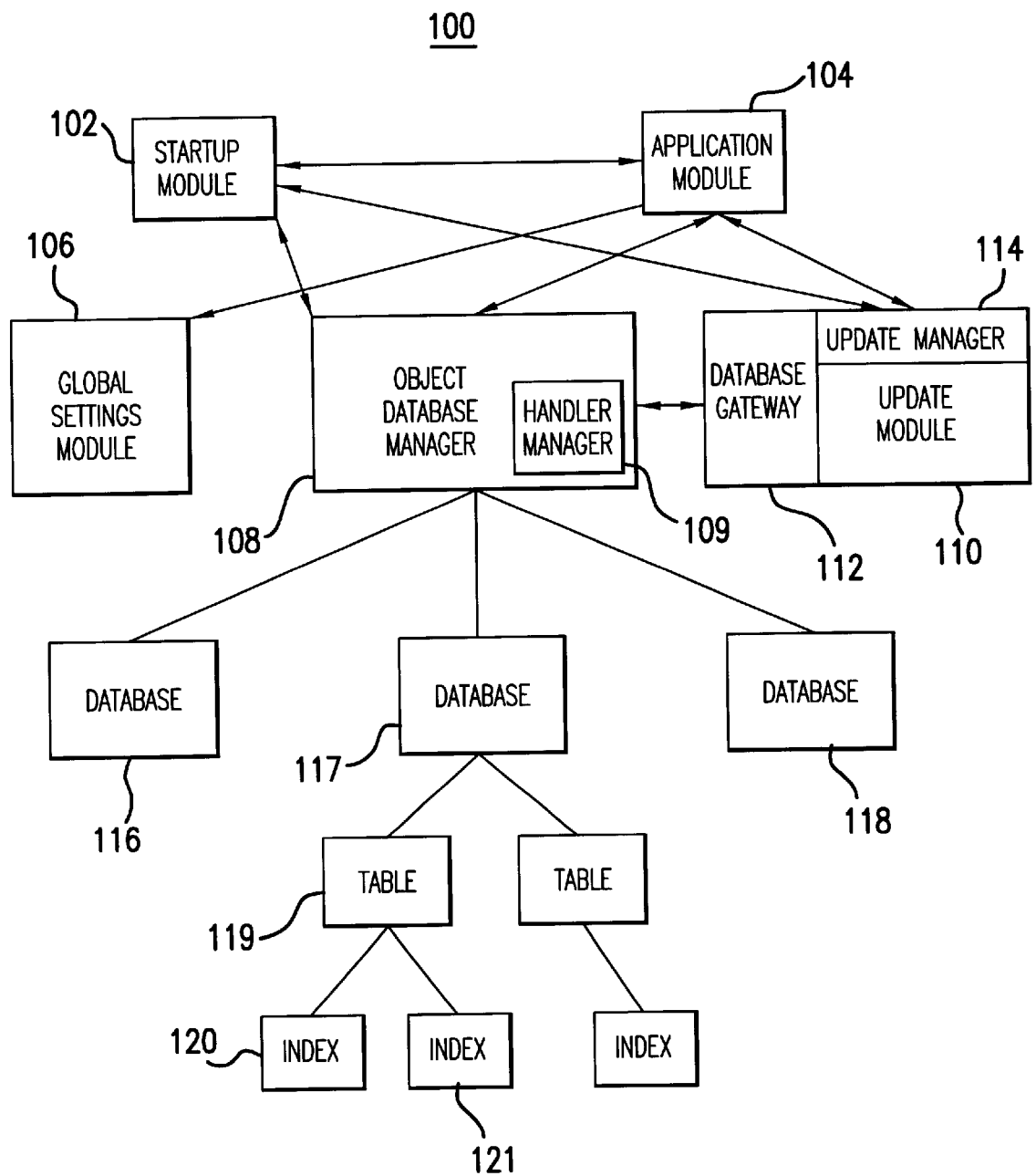
FIG. 1C illustrates an exemplary embodiment of the dynamic application browser according to the present invention.

FIG. 1C illustrates an exemplary embodiment of the dynamic application browser according to the present invention. The dynamic application browser according the present invention is adapted to run on the computers 100 and 101. For the sake of brevity, the software that comprises the present invention will be described only as it is implemented on a client computer 101. However, any differences between the software implemented on the network computer 100 as compared with the client computer 101 will be described.

The present invention includes a startup module 102, an application module 104, a global settings module 106, an object database manager 108, and an update module 110. The update module 110 includes a database gateway 112 and an update manager 114. The object database manager 108 includes a handler manager 109. The handler manager 109 is used to install data received from another computer in the local computer. This will be described with respect to FIGS. 13–15. Each database 116, 117, 118 corresponds to a different application module (e.g., application module 104). Alternatively, multiple application modules can share the same database or can each use multiple databases either exclusively or inclusively.

The startup module 102 controls the initialization of the computer 101. The present invention can include one or more application modules, which are run by the dynamic application browser that comprises the present invention. The application module 104 can be any type of application that may need the resources of an object database manager to retrieve and store objects in an object database. The update module 110 performs updating of objects stored in the at least one database on the computer 101. The object database manager 108 manages the databases. The object database manager 108 controls the functionality of multiple databases 116, 117, 118. Each database stores tables 119 which include at one index 120, 121. The databases 116, 117, 118 store objects 122 (or data) as elements of a table 119. The elements in table 119 are then used to create one or more indices 120, 121 which allow the elements in the table 119 to be easily accessed. According to one embodiment of the present invention, only one type (e.g., objects of a particular class) can be stored in a single table. The "type" of an object is defined as, for example, the structure and fields contained in the object.

FIG. 1H–1L illustrate an exemplary embodiment of the file structure of the databases 116, 117, 118. Each database 116, 117, 118 includes a database file (not shown) containing a list of all tables in the database. In addition, each database 116, 117, 118 includes a file glossary file (FIG. 1H) which maps all symbolic file names to physical file names (e.g., the table names listed in the database file with physical file names). In an alternative embodiment of the present invention a global file glossary file is used to map all symbolic file names for all of the databases 116, 117, 118.

Each table 119 has associated therewith a table file (FIG. 1I), a data file (FIG. 1J), a file map (FIG. 1K), at least one index file (FIG. 1L), and a random access file (RAF) (not shown), all stored on a recordable medium such as a hard drive. The table file includes information such as the type or class permitted in the table, a disk cache policy, the number and file names of the indices associated with the table, a symbolic name for the file map, and the file name of the random access file.

The index file contains a list of object IDs associated with the index values of the index. There is one index file created for each index of the table. The index file also includes the class name describing the type of value stored in the index (e.g., string, integer, or any other permissible Java™ type), the name of a method (or procedure) which is called by the object database manager 108 to extract the index value from an indexed object, and a flag indicating whether there is a one-to-one relationship between objects and index values (e.g., a social security number should have a one-to-one relationship with a person object since no two people share a social security number).

The file map includes a list of object IDs associated with file size and file offsets (file pointer values) in the random access file. Objects within the database are stored in a serialized form in the random access file and the file offset indicates the physical location of the serialized object. The file map also includes the total size of the random access file, the end pointer value of the random access file, and the total number of objects stored in the random access file.

The data file includes the symbolic name for the random access file and the symbolic name for the file map.

An example of an object 122 is illustrated in FIG. 1D. The exemplary object 122 of type "person" includes a unique identification field (ID), a first name field (FIRST NAME), a last name field (LAST NAME), and an age field (AGE). An example of a table for "person" objects is illustrated in FIG. 1E. In addition, the object type may be any type available in Java™ provided it can be represented as an array of bytes and provided it can have a unique object ID assigned to the object. The exemplary table shown in FIG. 1E includes at least one object 122 of the "person" type. An example of an index 120 is illustrated in FIG. 1F. The index 120 sorts each of the objects in the table 119 by, for example, its last name field. Of course, it is understood that the index may be sorted on any parameter found in the object 122. The index 120 includes a last name value column and an object identification (ID) column. FIG. 1F illustrates another exemplary index 121 which is stored by "FIRST NAME." In this case, since objects with object IDs of 1 and 2 both contain a first name field having the same value, the index 121 lists both object IDs in the same row corresponding to the first name "Mark."

Referring to FIG. 1C, the startup module 102, which controls the initialization of the computers 100, 101, will now be described. The startup module 102 is connected to the global settings module 106. The global settings module 106 initializes various parameters for the operation of the system. For example, the location of the various databases 116, 117, 118 can be stored in the global settings module 106. The startup module 102 also interfaces with the object database manager 108 to reference, retrieve, and store items in the various databases 116, 117, 118. The startup module 102 also interfaces with the update module 110 via the update manager 114. The update module 110 assists the system in uploading and downloading objects from a remote computer e.g., either the network computer 100 or a client computer 101. The update module 110 may be called by the startup module 102 during the initialization process to update the database 116, 117, 118 with any information that is transferred from another computer. Alternatively, the update module 110 may be called by the application module 104 to update the databases 116, 117, 118 on the local (executing) computer with information created by the application.

The update module 110 communicates with the object database manager 108 via database gateway 112. Database gateway 112 serves as an interface between the database manager and the update module 110, so that the update module 110 can transfer new objects received from remote computers to the appropriate tables stored in the databases. In particular, the database gateway 112 is able to convert the instructions to and from the update module 110 into commands that are understood by the database manager 108, as well as the update module 110. In this way, if a different database is used with the present invention, (e.g., any Java™ Database Connectivity (JDBC) compliant database, such as an Standard Query Language (SQL) server), it is only necessary to change or program the database gateway 112 to a database gateway that can interface with the new database. In an alternative embodiment of the present invention, the database gateway 112 automatically detects the type of database connected to it and converts the instructions to and from the update module 110 into commands that are understood by the database manager 108, as well as the update module 110.

Once the startup module 102 has completed the initialization process of the computer, control is transferred to an application module 104 which can communicate with any of the global settings module 106, the object database manager 108, and/or the update module 110, to run its specific application. Examples of application modules 104 include games, educational training programs, electronic commerce programs, finance applications, and any other application which may need the resources of an object database manager to retrieve and store objects in an object database. In addition, an application can utilize the update module 110 via the update manager 114 to send and receive information to and from a remote location, such as for example, product requests, product information, test scores, application updates, usage statistics, customer information, and/or additional application modules or portions thereof.

Figure 2:
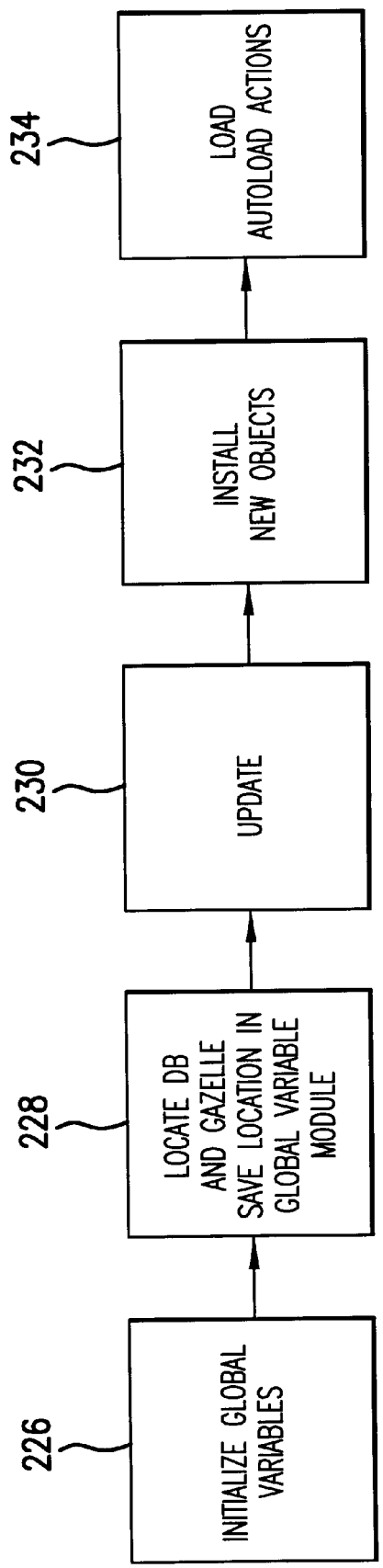
FIG. 2 illustrates an exemplary process performed by the startup module of the present invention.

FIG. 2 illustrates an exemplary process performed by the startup module 102. In step 226, the global variables are initialized. A global variable is a setting, value, or resource (i.e., a reference to a database) that is referenced by one or multiple modules in the dynamic application browser. Since these global values are used throughout the use of the dynamic application browser (e.g., in the startup procedure), it is necessary for their locations to be predetermined, such that the various modules of the browser can locate the various databases as well as information pertaining to the location, e.g., Internet addresses of remote computers. In step 228, after initializing the global variables in step 226, the specific database 116 associated with a desired application module is located and the location of the specific database 116 is stored in the global settings module 106. In the embodiment currently implemented, there is only one application module available for execution. It is within the skill of the ordinary artisan to implement the present invention with more than one application, and to then prompt the user to select the application he/she desires to run. In an alternative embodiment of the present invention, all of the available databases are located and the location of each database is stored in the global settings module 106. In step 230, the update module 110 sends and receives objects to and from a remote location, e.g., the network computer 100 or other client computer 101, connected via a network or Internet connection. The new objects received by the update module 110 are then installed in the appropriate database corresponding to the application module in step 232. In step 234, the default or the selected application module 104 is loaded by initiating a standard setup protocol such as initializing the model, view, and controller for the application module 104.

Figure 3:
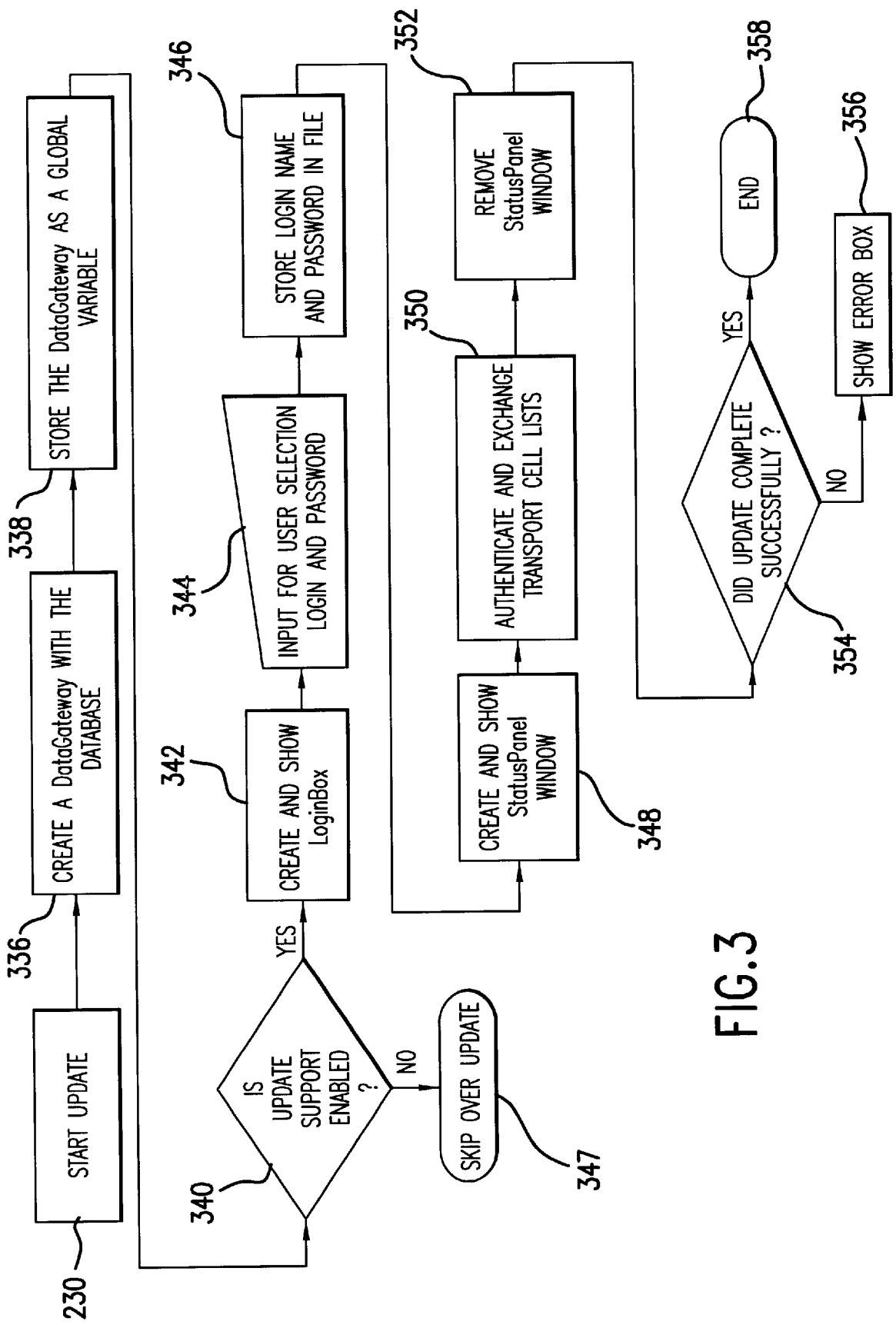
FIG. 3 illustrates an exemplary flowchart for the update step 230 of FIG. 2.

FIG. 3 illustrates an exemplary flowchart for the update step 230 of FIG. 2. In step 336, a database gateway 112 is accessed to interface with the object database manager 108. The location of the database gateway 112 is stored as a global variable in the global settings module 106 in step 338. In step 340, the startup module 102 verifies that update support is enabled. If update support is not enabled (e.g., no network connection is present), the update process is skipped in step 347. If, however, update support is enabled, a login prompt is created and displayed to a user of the local terminal in step 342. In step 344 the user enters a user name and password, for example, which is then stored in a file in step 346. A status panel is displayed to the user in step 348 to inform the user of the status of the update procedure and also to prevent the user from thinking that the system has stopped operating properly due to the potential delay caused by the update module. In step 350, the user information is sent to the network computer from the client computer. The network computer 100 authenticates the user and sends back a message indicating whether or not the authentication was successful. In addition, if the authentication is successful, new objects which were designated to be exchanged between the two computers, and particularly, in tables containing any transport cell lists (described below with respect to FIGS. 13–16), are exchanged. If the authentication was unsuccessful, an error message is generated and displayed to the user (not shown). The user may be prompted again or the program may shut down. Upon completion of the authentication and updating of the computers via the exchange of objects, the status window is removed in step 352. In step 354 the startup module verifies that the update process was completed successfully. If yes, the update process ends in step 358, otherwise, an error message is created and displayed to the user in step 356.

Figure 4:
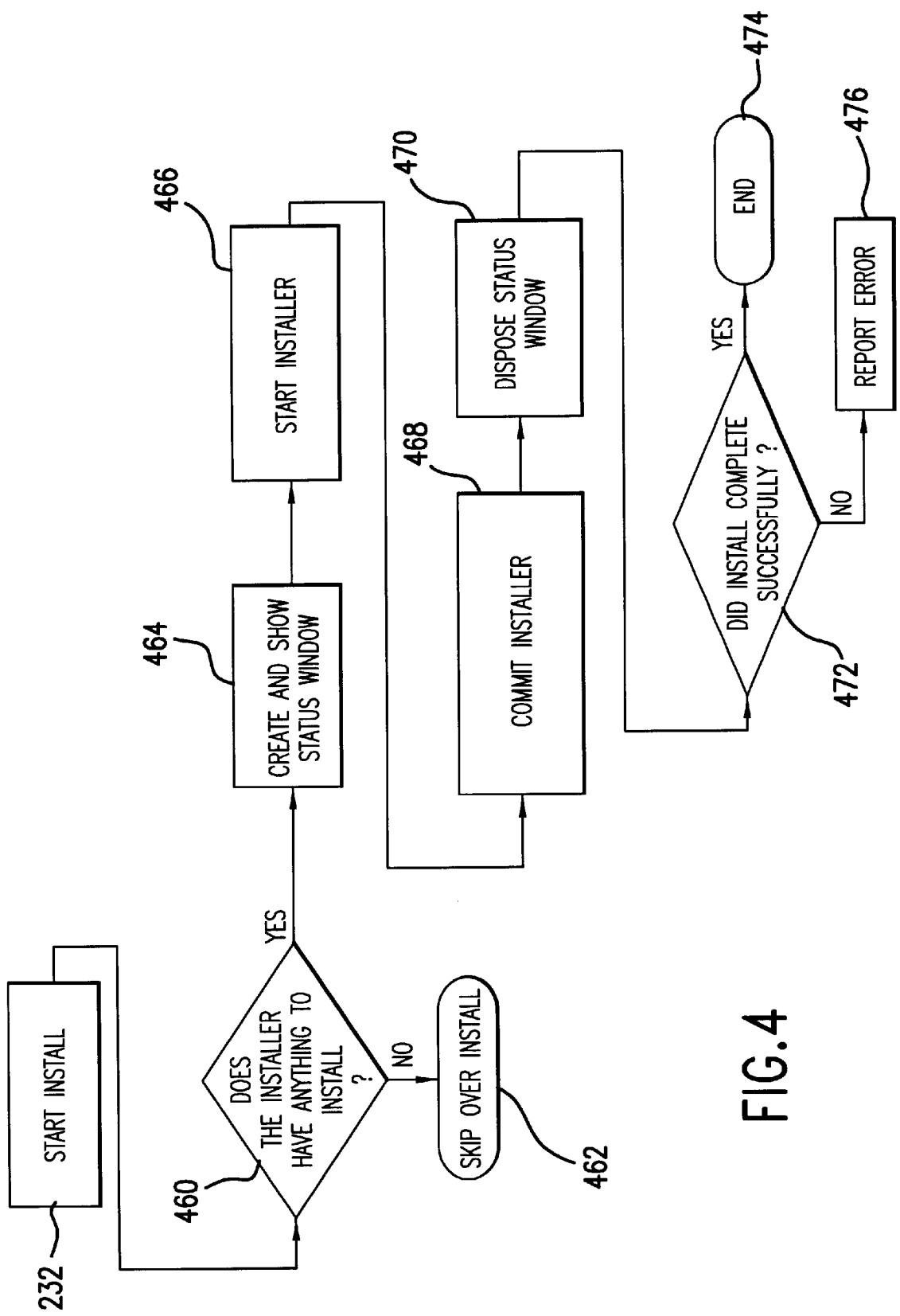
FIG. 4 illustrates an exemplary flowchart for performing the install step 232 of FIG. 2.

FIG. 4 illustrates an exemplary method for performing the install step 232 of FIG. 2. In step 460, the startup module 102 checks with the update module 110 via the update manager 114 to see if any new objects have been received from any of the remote computers via the exchange of transport cell lists from step 350. If no new objects are present, the install procedure is skipped in step 462. If, however, there are new objects present, a status window is displayed to the user in step 464 and the installation of the new objects in the database is begun in step 466. An exemplary installation procedure is described with respect to FIGS. 15A–15C, below. After the installation of the new object is completed in step 466, the installation is made permanent by committing the changes to disk in step 468. In step 470, the status window is removed and in step 472, the startup module 102 verifies that the install procedure has been completed successfully. If the install procedure 232 has been completed successfully, the install procedure 232 ends in step 474. Otherwise, if the install procedure 232 did not complete successfully, an error is reported to the startup module 102 on step 476.

Figure 5:
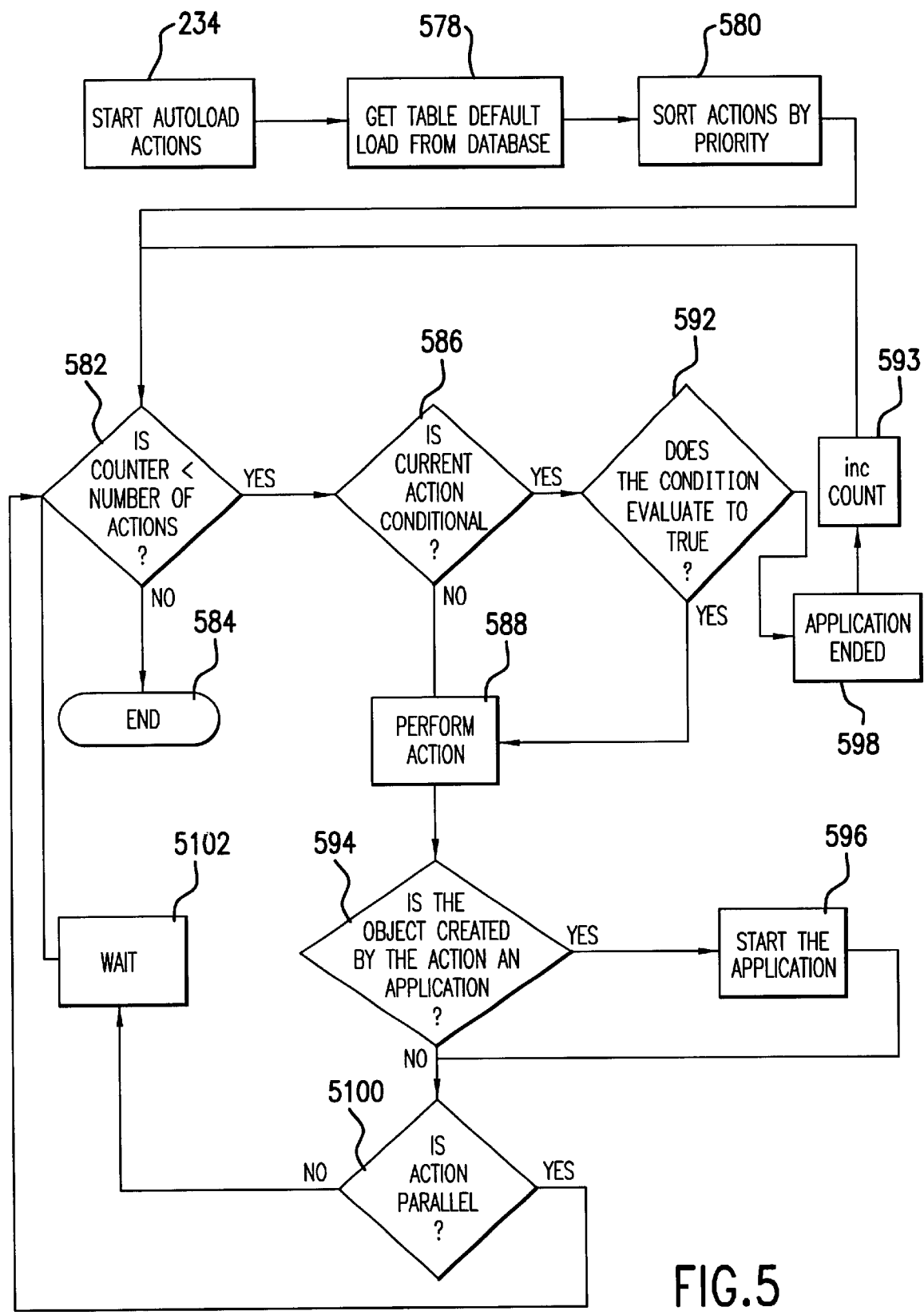
FIG. 5 illustrates an exemplary flowchart of the autoload actions module 234 of FIG. 2.

FIG. 5 illustrates an exemplary embodiment of the autoload actions module 234 of FIG. 2. In step 578, a table from the database is retrieved that contains a list of actions to be performed by the autoload actions module 234. Actions are defined, for example, as procedures instructing the dynamic application browser to perform a specific task, such as start an application module, create a new database, or modify the structure of an existing database. In the table, each action contains a priority value. In step 580, the actions are sorted in order of priority, so as to perform the action with the highest priority first and the action with the lowest priority last, and so forth. In step 582, the autoload actions module 234 verifies to see if there are actions to perform, by referencing a counter that represents the total number of actions in the table retrieved in step 578. If the counter equals the total number of actions that have been performed, then the autoload actions module 234 is completed in step 584. If the counter is less than the total number of actions that have been performed, then the next action is evaluated to determine whether or not it is a conditional action in step 586. A conditional action is an action that is only to be performed based on the occurrence of certain events. For example, an action may only need to be performed if it has not been performed in the past. That is, for example, the action may be to initialize a new database and would be unnecessary if the database already existed. In addition, an action can be conditional based on the time of day or day of the week, or any other condition that can be evaluated and can return a boolean value. If the current action is not conditional, then the action is performed in step 588. Otherwise, the condition is evaluated in step 590. If the condition evaluates to "true" then the action is performed in step 588; otherwise in step 593 the counter is incremented, and the process returns to step 582.

After the action is performed in step 588, the startup module 102 determines whether or not the action created an object which represents an application module 104. If the action created is determined to be an application module 104, the application module is executed in step 596 and the startup module 102 waits for the completion of the application module 104 in step 598. Upon completion of the application, the counter is incremented in step 593 and the procedure returns to step 582. If the object created by the action in step 594 is not an application, the startup module 102 determines whether or not the action can be performed in parallel with additional actions. That is, the startup module 102 determines whether or not it is necessary to delay the execution of any additional action until the completion of the present action. If the action can be performed in parallel with other actions then the procedure returns to step 582 immediately. Otherwise, the procedure waits in step 5102 for the completion of the action, before returning to step 582.

FIGS. 6–12 illustrate exemplary operations of the database manager 108 in FIG. 1. In an exemplary embodiment of the present invention, the object databases 116, 117, 118 are used to store Java™ objects. The database manager 108 manages the databases 116, 117, 118 by adding, deleting, or changing objects stored therein as required. To ensure the efficient operation of the browser and the associated application according to the present invention, the database used in the present invention is designed to be less complex than conventional relational databases. That is, instead of forcing data from an application into relational rows, objects are stored as created, and placed into tables. This efficiency allows for the fast and easy operation of the database as well as its portability with multiple application modules 104. In addition, the less complex and faster database of the present invention uses less resources than a conventional database, thereby providing more available resources for the application modules. Since typical personal computers have limited resources available to run Java™ applications, the efficiency of the database of the present invention allows for sophisticated data access in the low resource environment of a personal computer. Exemplary functions of the database manager which operates on the database include the ability to insert an object into the database, the ability to change (or replace) an object in the database, the ability to retrieve objects from the database, and the ability to delete objects from the database. The format of the database, particularly the use of tables, objects, and object IDs within those tables, facilitate the use and speed of the browser, applications which run or the browser, and the database. In addition, the format of the database allows the browser to be dynamic. That is, for example, since objects in the database can be easily added, modified, and removed, applications (or content for the applications) can be added, deleted, or modified sexlessly. In addition, the browser itself can be modified by simply adding, modifying, or deleting objects from tables within a database. Furthermore, the format of the database allows for efficient and easy software development by allowing programmers to place objects into the database in their original Java™ form (without having to convert the objects to forms compatible with conventional databases such as breaking the objects into numerous differently typed rows).

According to one embodiment of the present invention, changes made to the database are first made temporarily in memory, and then are made on disk. This provides the ability to restore the database state in the event of an error. The procedure used to make changes to the databases 116, 117, 118 permanent is called commit. The procedure used to reverse changes made to the databases 116, 117, 118 before making them permanent is called rollback.

A further function of the database manager is the ability to modify, delete, or retrieve objects in a database based on a condition. For example, a user or application may wish to delete all objects in a database that are older than a predetermined date. In addition, it may be desirable to modify or retrieve all objects which contain a specific field having a specific value. The delete, modify, and retrieve by condition functions are useful when the identity of the object is not readily available to the application or user at the time the decision is made to modify or delete the object or set of objects. An exemplary embodiment of implementations of these feature are described more fully below.

Figure 6A:
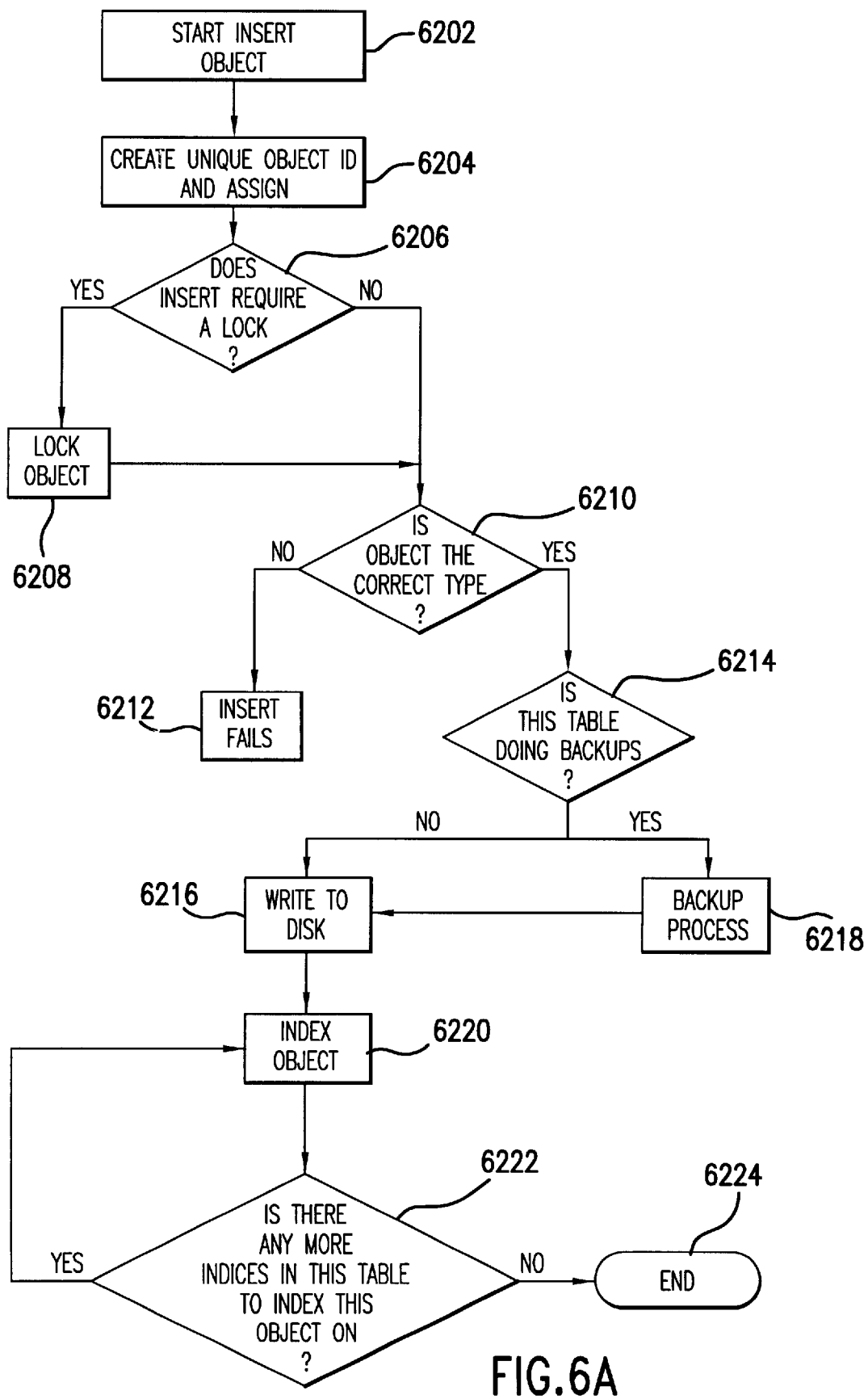
FIG. 6A illustrates an exemplary embodiment of the insert object functionality of the database according to the present invention.

FIG. 6A illustrates one embodiment of the insert object functionality of the database 116–118 and database manager 108 according to the present invention. In step 6202, a command is sent to the object database manager 108 indicating that an object is to be inserted into a particular table of a particular database (e.g., the database corresponding to the application module running at the time the command is set). In step 6204, a unique object ID is created which identifies the object to be inserted. After the object ID is created, the object ID is inserted into the object. In an exemplary embodiment of the present invention, object IDs are assigned sequentially such that the first object placed into the database is given the ID of 1. This object ID is incremented by one for each new object inserted into the database. In this way, each object will have a unique ID since once an object ID is assigned to an object, that object ID is never used for another object in the same database again.

To prevent multiple applications or multiple requests from changing the same object at the same time, it may be necessary to place a lock on the specified object. A lock is necessary whenever a user or application wishes to save a retrieved object in the database. For example, two applications (or processes) running at the same time may try to modify the same object at the same time. Therefore, in step 6206 the database manager 108 evaluates a flag contained in the table 119 which identifies whether or not a lock is required to be placed on an object of the table to prevent simultaneous access to objects of the table.

If a lock is required, then in step 6208 the object is locked. If a lock is not required or after the completion of the locking step (i.e., the object successfully locked), the object database manager 108 verifies that the object to be inserted into the table matches the correct object type in step 6210. Each table has a flag which indicates the class (or type) of object that is allowed to be inserted into the table. As noted above, the type is defined as, for example, the structure, fields, and functionality contained in the object. If the object type does not match, the insert fails in step 6212, the insert object procedure is cancelled and an error message is generated.

If, however, the object type matches the type allowed by the table, then in step 6214, the object database manager 108 determines if the table is set to perform backups., Backups are defined as storing data representing previous versions of tables to prevent corruption of the data. If backups are to be performed for this table, then the backup procedure is begun in step 6218 in which the table is copied into a backup file. After the backup procedure, or if the table is not set for backups to be performed, the object is then written to disk or other recordable media such as a hard drive, an optical drive, a virtual drive, or any other media which can be used to store and retrieve data at step 6216. After step 6216, the object is indexed according to the available indices of the table at step 6220. For example, if an object has a first name and a last name field, and the table includes an index which is based on the last name field, then the object database manager 108 will index the new object in the "last name" index of the table. This allows a user to locate the object by instructing the database manager 108 to search for the last name field in the appropriate last name index which would then identify the object ID which is stored in the table. After the object is indexed in step 6220, the object database manager 108 checks to see if there are any more indices for the particular table in step 6222. If so, then the object is indexed for that particular index in step 6220. This procedure repeats for each index. When all indices have been updated with the new object, the insert object procedure is completed in step 6224.

Figure 19B:
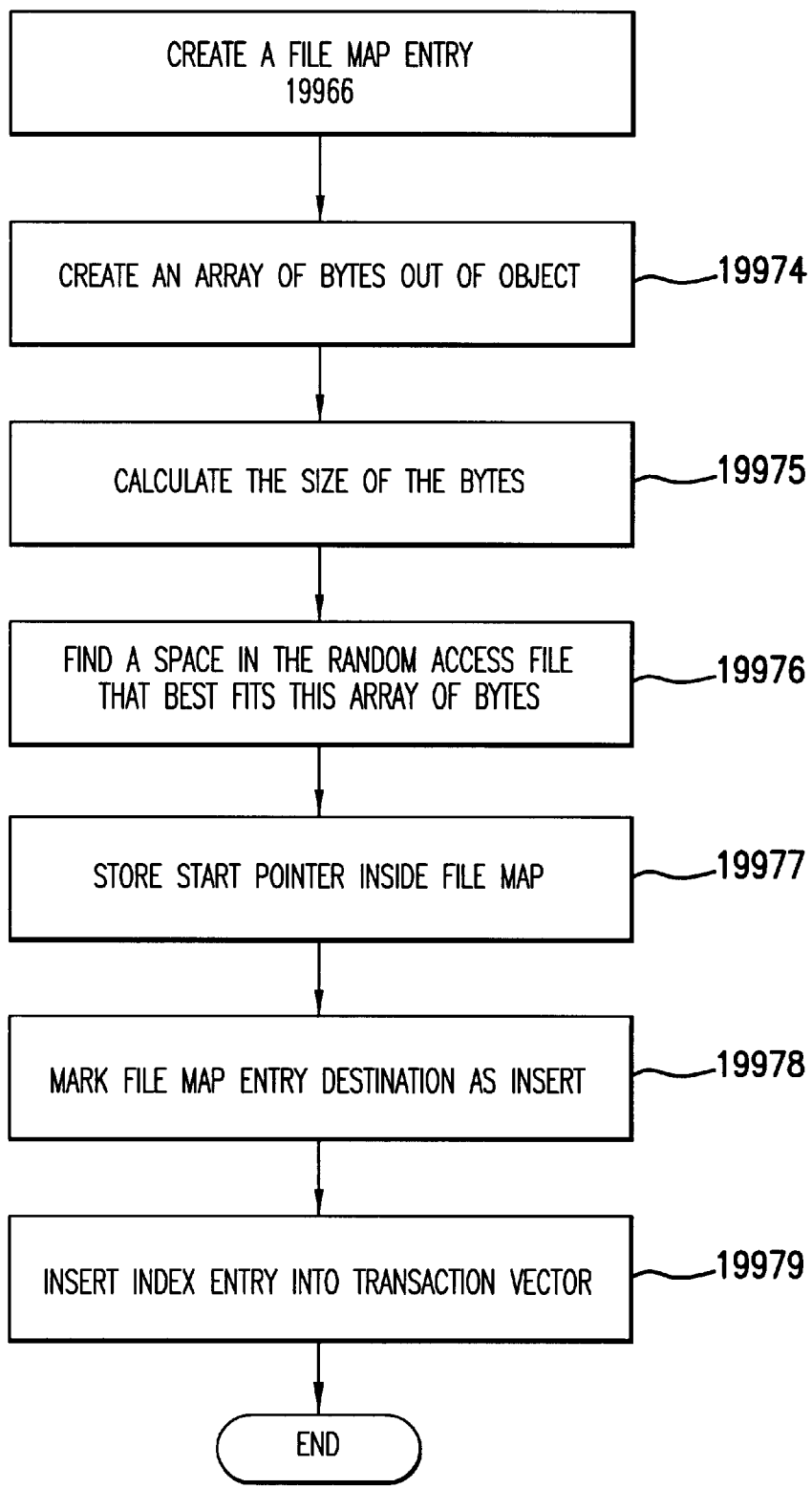
Figure 19C:
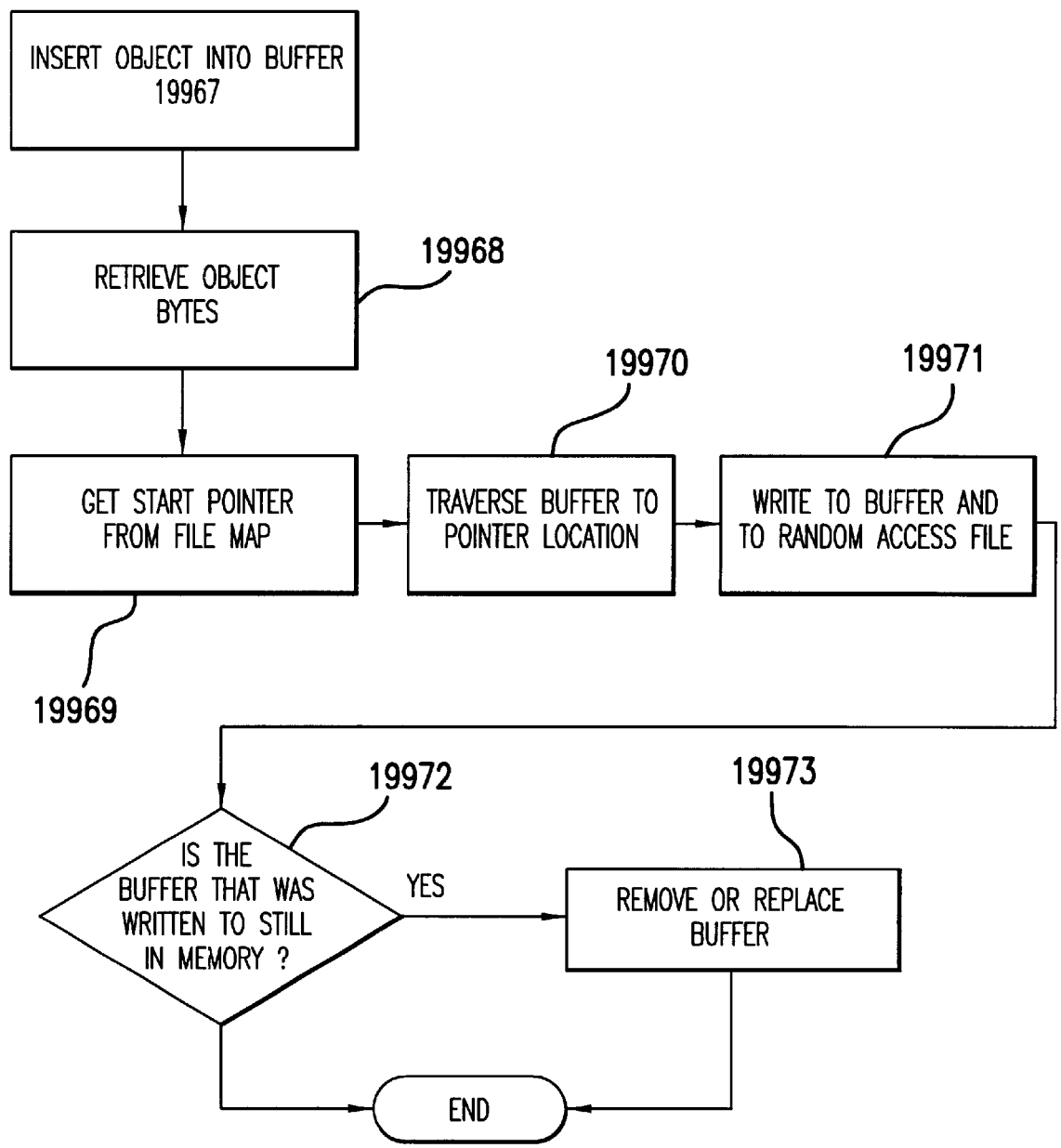

FIGS. 19A–19C illustrate an exemplary embodiment of the write to disk step 6216 of FIG. 6A. With respect to FIG. 19A, an object is written to a random access file by first extracting the object ID from the object in step 19963. The object ID and the object itself are sent to the object database manager 108 so that the object database manager 108 can verify that the object ID does not already exist in the designated database in step 19964. In step 19965, it is determined if the object ID is unique. If so, in step 19966, an entry is created in the table file map for the table associated with the object. If the object ID is not unique, then an error is reported in step 19990 and the insert fails.

As mentioned above, the functionality of the database manager 108 and the databases 116, 117, 118, include the ability to make changes to the databases temporarily and/or permanently. To prevent errors in writing to the random access file, a buffer is used to store a subsection of the contents of the random access file in memory temporarily. In step 19967, the object is stored in memory in its appropriate location in the buffer, and once the contents are verified as being accurate, the contents of the buffer are then stored in the random access file replacing its existing contents, if any. Thus, all changes to the random access file are made at one time from the buffer in the commit process. In an alternative embodiment of the present invention, objects are written directly to the random access file without storing them first in the buffer.

The use of buffers not only ensures the reliability of the writing procedure, but they also can speed up the access time required to retrieve items from the random access file. In addition, another type of buffering provides the advantage of fast access of any object. That is, for example, retrieving an object can be anticipated by the application module 104 prior to the actual retrieving and it can be placed in the buffer. In addition, prior to writing to the file map corresponding the random access file, the changes made to the buffer are stored in a memory as a transaction vector, so that each of the changes to made to a table can be reversed, if necessary, before committing them. Since the file map is not changed until a commit is called, then in the event of a rollback after a change is made and realized to be incorrect, it is only necessary to restore the buffer of the file map to its original contents (before the change) by reloading the data from the file map or alternatively, restoring the file map to its original condition by reversing the changes stored in the transaction vector.

FIG. 19B illustrates an exemplary embodiment of the create a file map entry for the object step 19966 of FIG. 19A. In step 19974, an array of bytes is created from the object (e.g., by using conventional Java™ serialization techniques). In step 19975, the byte length or size of the array is calculated. In step 19976, a start pointer is assigned which represents the file index for the first byte of free space in the random access file large enough to accommodate the array of bytes. In step 19977, the pointer value determined in step 19976 is stored in the file map. In step 19978, the pointer value stored in step 19977 is marked as an "insert" pointer in the file map. In step 19979, the change to the file map is logged in the transaction vector.

FIG. 19C illustrates an exemplary embodiment of the insert object into the buffer (step 19967 of FIG. 19A). In step 19968, the object is serialized into an array of bytes. In step 19969, a start pointer for the object is retrieved from the file map by evaluating the available free space. In step 19970, the buffer is traversed to the appropriate pointer value where the new object will be stored. In step 19971, the object is stored in the buffer and then after a commit is called, in the random access file. In step 19972, after a commit, it is determined if the buffer currently in memory is the buffer that was just modified. If so, then in step 19973, the buffer is removed (or restored) from the random access file to keep the contents of the buffer current. In an alternate embodiment of the present invention, multiple buffers may be used to store contents of random access files.

Figure 6B:
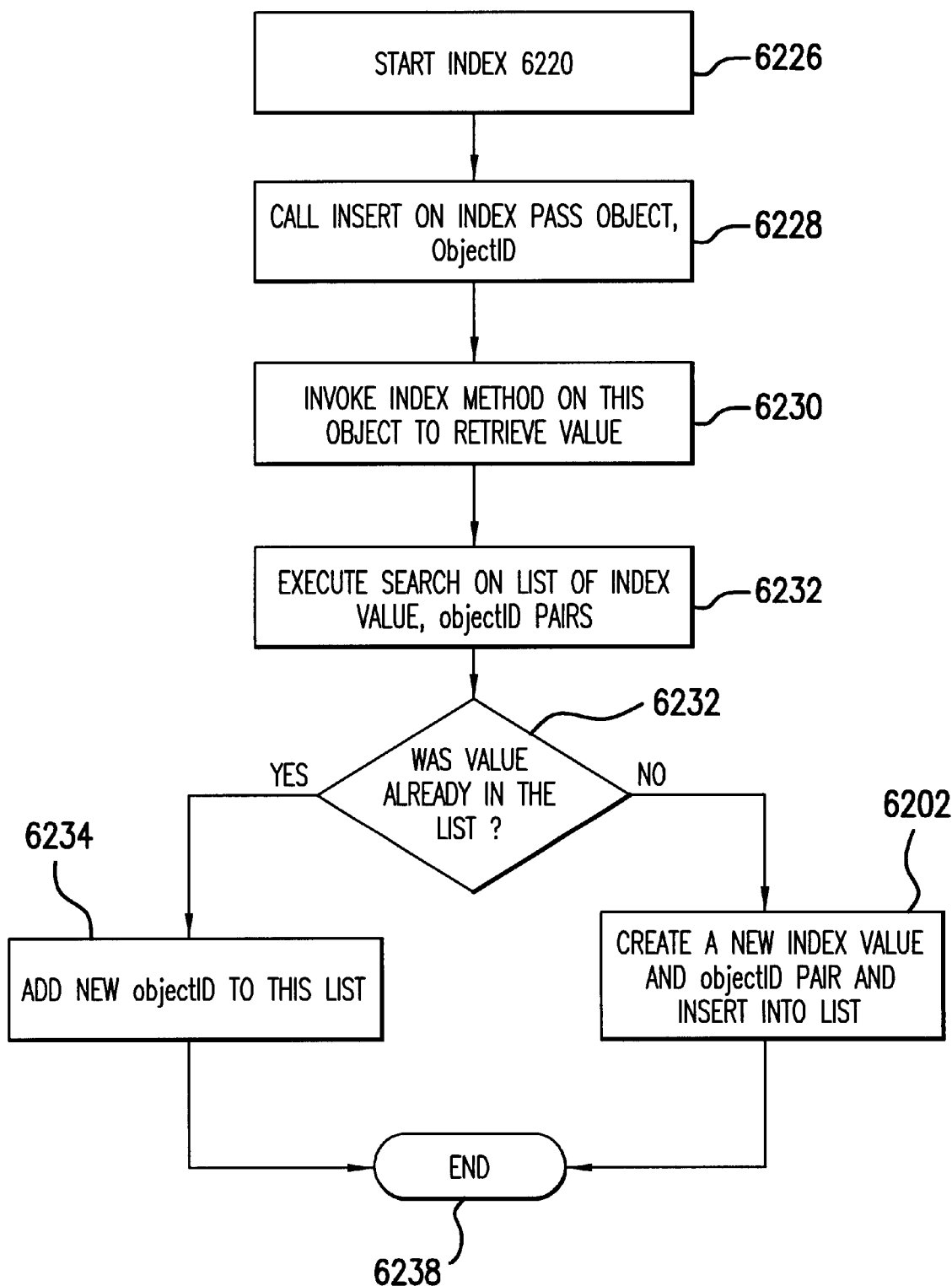
FIG. 6B illustrates an exemplary embodiment of the indexing step 6220 of FIG. 6A.

FIG. 6B illustrates an exemplary embodiment of the indexing step 6220 of FIG. 6A. To index an object, an index procedure is performed which uses the object and the object ID in step 6228 for each index 120, 121 in the table 119. In particular, the index routine 6220 is called to insert an entry into one of the indices associated with a table in a database and the parameters passed to that routine include the object and the object ID, which are to be indexed. A method or procedure (stored or referenced in the index file) is performed on the object to obtain an index value at step 6230. This index value corresponds with the value used by the index to sort the objects of the table. For example, the index may sort on the index value of the last name field of an object. In addition, the index may sort on the date of creation of the object. As discussed above, an index may be created for any of the parameters or fields within or relating to the object. Once the index value is retrieved in step 6230, a search is performed on the existing contents of the index to determine if the index value is.already present in the index. The search may be done by any appropriate method, for example, a binary search may be used. If the index value is already present in step 6232, the new object ID is inserted next to the already existing object IDs that correspond(s) to the index value in the index in step 6234. Otherwise in step 6236, a new index value is created and the object ID which corresponds to the new index value is placed in the list. The procedure ends with step 6238.

Figure 7A:
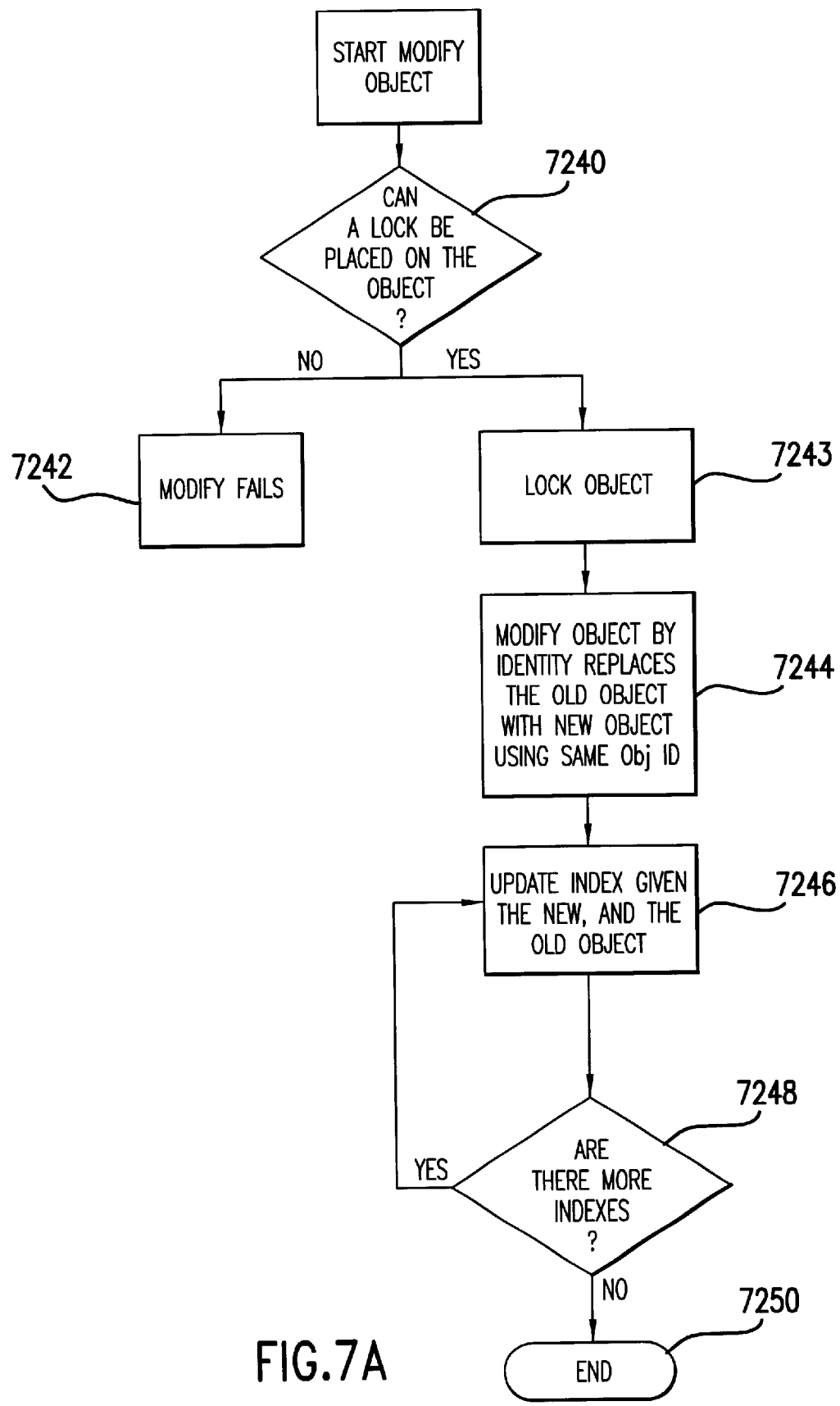
FIG. 7A illustrates a flowchart of an exemplary modify procedure performed by the database manager according to the present invention.

FIG. 7A illustrates an exemplary modify procedure performed by the database manager 108. To modify an object, that is, modifying an existing object by replacing it with a changed object, the object database manager 108 must first verify that a lock can be placed on the object to be replaced (or modified) by the action requesting the modify procedure in step 7240 to avoid another request to modify that object at the same time. If a lock cannot be placed on the object, then the modify fails in step 7242. This may occur, for example, if a lock is already placed on that object, indicating that it is currently being changed by another request. If, however, a lock can be placed on the object, then the object is locked by setting a flag associated with that object at step 7243, and the old object is retrieved in step 7244. This is performed by asking the table to return the object with a specific object ID. The table uses the file map to determine the physical location of the requested object. Since the modify procedure is modifying an existing object, the specific object ID is known to the application requesting the modification. In step 7246 given both the new object and the old object, each index is updated to reflect the change of objects. For example, if there was a change in the last name field, the comparison of the old object with the new object would reflect that the last name has changed. In this case, the index would be updated to reflect the new index value for the modified object. The object ID remains the same. Step 7248 repeats step 7246 for each index for the table. Once all of the indices have been updated, the update procedure is completed in step 7250.

Figure 7B:
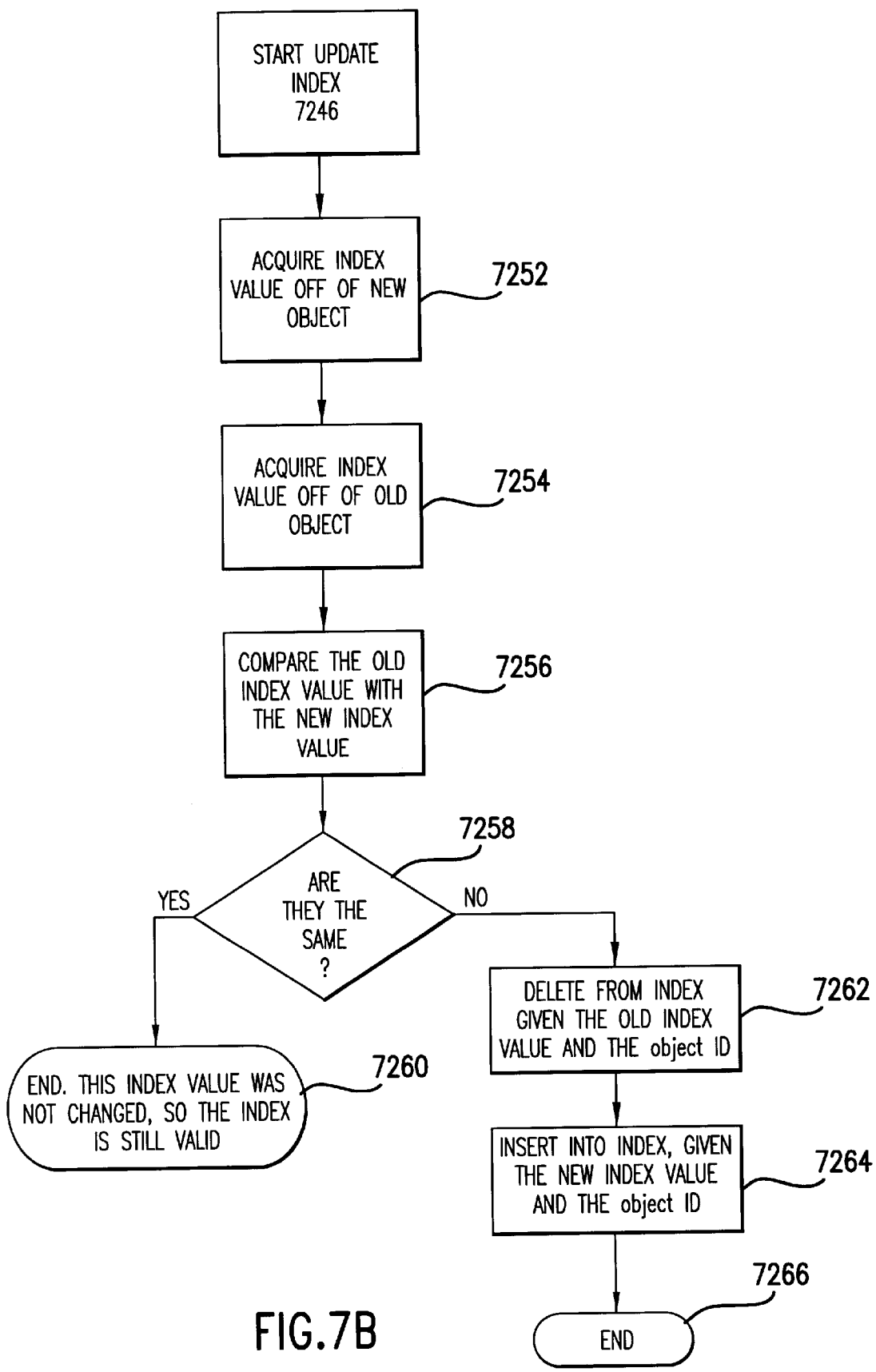
FIG. 7B illustrates an exemplary embodiment of step 7246 of FIG. 7A.

Step 7246 will be explained further with respect to FIG. 7B. In step 7252, the index value, that is, the value according to which the index sorts the objects, is extracted from the new object. In step 7254, the index value of the old object is extracted. In step 7256, the old value and the new value are compared and if the index values are the same in step 7258, then the index is still current and it is not necessary to change the index and the procedure ends in step 7260. If the old index value and the new index value are not the same then, in step 7262, the object ID is removed from the index. If the object ID removed was the only object ID which corresponds to that specific index value, the index, value is also removed from the index. In step 7264, the new index value is inserted into the index if the new index value does not already exist, along with the object ID. If the new index value already exists in the index, then the object ID is inserted. The index is now updated and the procedure ends at 7266.

Figure 8:
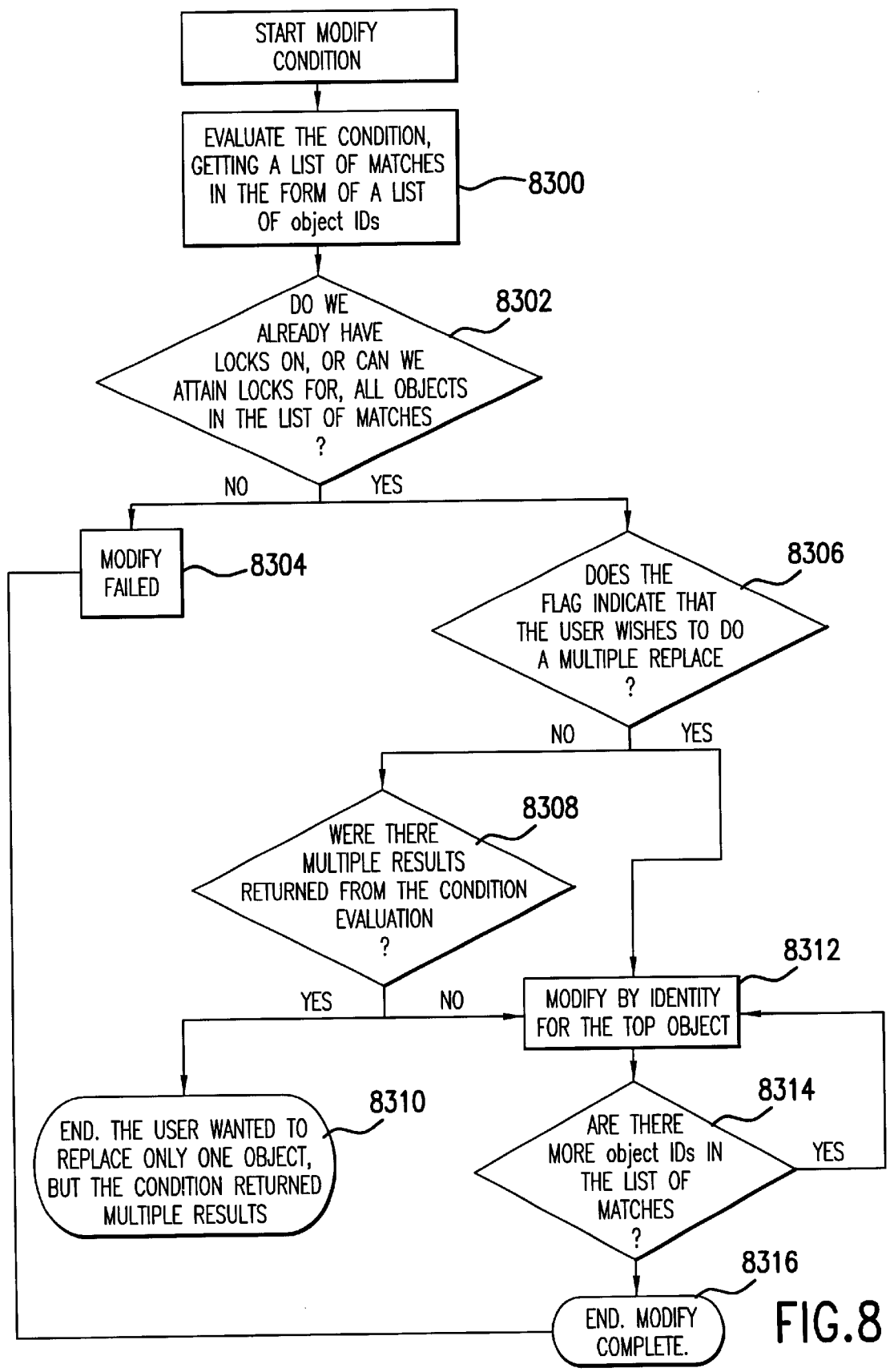
FIG. 8 illustrates a flowchart of an exemplary modify an object by condition procedure performed by the database manager according to the present invention.

In addition to updating an object by providing the unique object ID, it is also possible to modify an object by condition. That is, a user or application may not know which objects need to be modified until a condition can be evaluated. For example, it may be necessary to modify all objects in a given table which include a last name field having a particular index value. An exemplary embodiment of this feature is illustrated in FIG. 8. In step 8300, the value of the condition is evaluated and a list of objects which satisfy the condition is returned. In step 8302 the object database manager 108 determines if there are locks or whether locks can be established on all of the objects that have been identified that match the condition. If locks cannot be established on all of the identified objects, then the modify procedure fails, an error message is generated at step 8304, and the routine ends in step 8316. If, however, locks can be established then in step 8306, it is determined whether or not the user or application intended on replacing multiple objects. This intent can be communicated to the object database manager 108 via a variable or flag which is sent to the object database manager 108 when the modify procedure has begun. If the flag indicates that the application did not intend for the modify by condition to result in the updating of multiple objects, then in step 8308, the object database manager 108 determines whether or not multiple objects were returned from step 8300. If it is determined that multiple objects were returned in step 8308, then in step 8310, an error message is generated and the procedure ends. If, however, it is determined at step 8308 that only a single object was returned in step 8300, or if it is determined at step 8306 that the flag indicates that the user or application intended for multiple objects to be replaced, then the database manager 108 proceeds to step 8312. At step 8312, the first object is modified by the associated object ID, using the procedure shown in FIG. 7B. In step 8314, when the updating of the first object is complete, i.e., the modify by object ID procedure ends at step 7266, in step 8314, the object database manager 108 determines whether or not there are any additional object IDs in the list provided by step 8300. If so, the object database manager 108 modifies the object corresponding to the next object ID in the list in step 8312 again using the modify by object ID procedure. When all of the objects returned in step 8300 have been modified, the procedure ends in step 8316.

Figure 9:
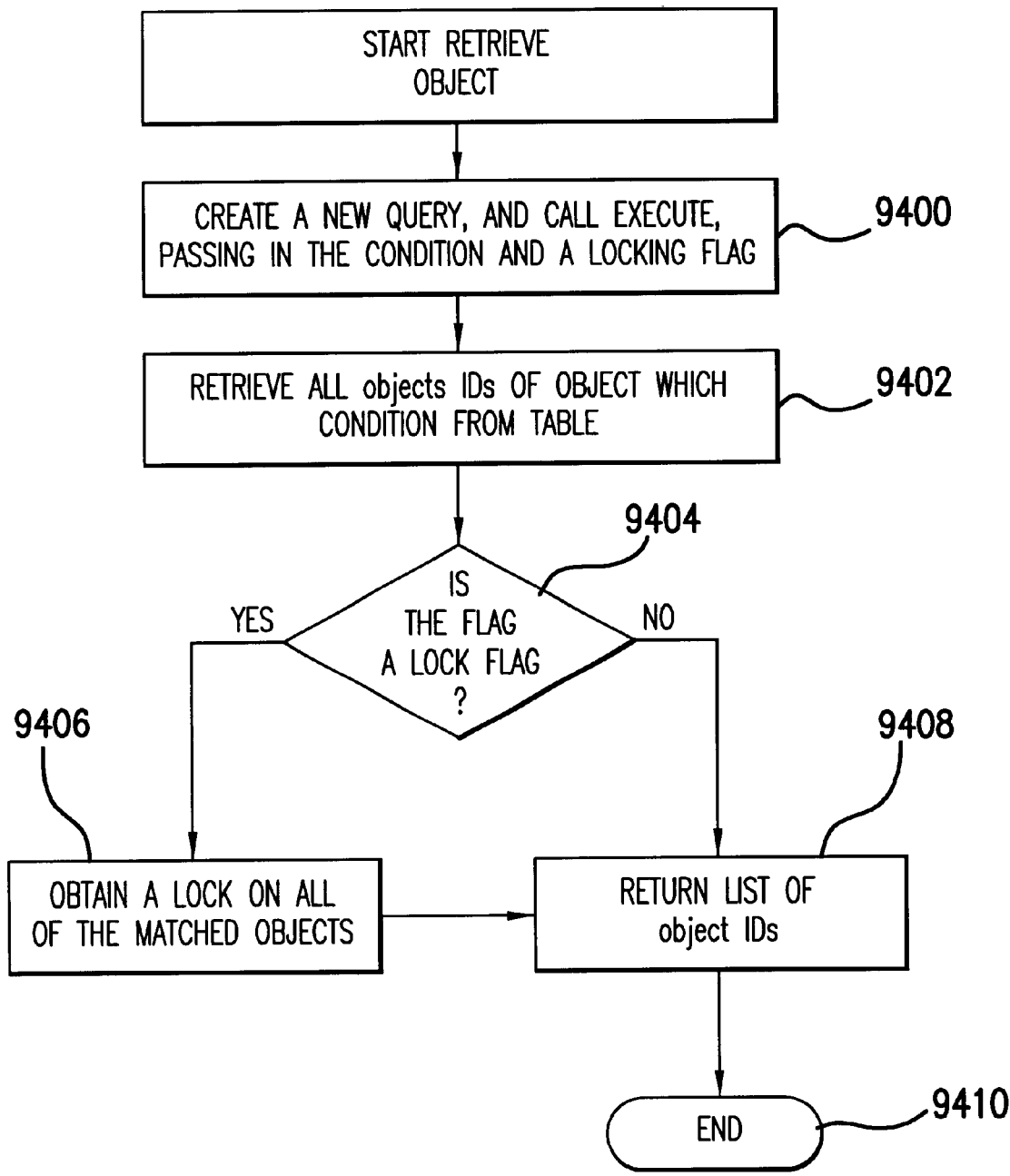
FIG. 9 illustrates a flowchart of an exemplary query a table by condition procedure performed by the database manager according to the present invention.

To retrieve an object having particular characteristics or values from a database, it is necessary to query a table with a condition so that the object database manager 108 can return the object IDs of the objects which match the query. An exemplary embodiment of this procedure is illustrated in FIG. 9. In step 9400, the query is sent to the object database manager 108. The query can be created by the user using the application or by an application itself. The query can be a boolean expression that returns a true or false, or the query can be an expression which returns a set of results. The query can specify that any or all databases 116, 117, 118, or any or all tables in any or all of the databases are to be searched for objects matching the query. In step 9402, the object IDs of all of the objects which match the query from the table are returned. To obtain the list of matching objects, the various indices associated with each table to be searched can be used to find the object IDs of the objects that meet the criteria presented in the query. In step 9404, the object database manager 108 determines whether or not it is necessary to establish a lock on the returned objects, based on a flag which is stored in the retrieved objects. In an alternative embodiment of the present invention, each table includes a list of locked Object IDs which is referenced by the object database manager 108. The flag is set by the application which sent the query to the object database manager 108. If it is necessary to lock the retrieved objects, the object database manager 108 locks each of the objects in step 9406. After completion of step 9406 or if it is not necessary to lock any of the objects, the object IDs are returned in the form of a list at step 9408, at which point the procedure ends in step 9410.

FIGS. 18A–18D illustrate an exemplary embodiment of the retrieving object IDs of all of the objects which match the condition in the query in step 9402 of FIG. 9. With respect to FIG. 18A, in step 18900, all object IDs are retrieved from the file map for the specified table. The query condition is evaluated in step 18902 and the clause evaluator returns the value of the condition (e.g., a set of object IDs or a boolean value). The procedure ends in step 18906.

Figure 18A:
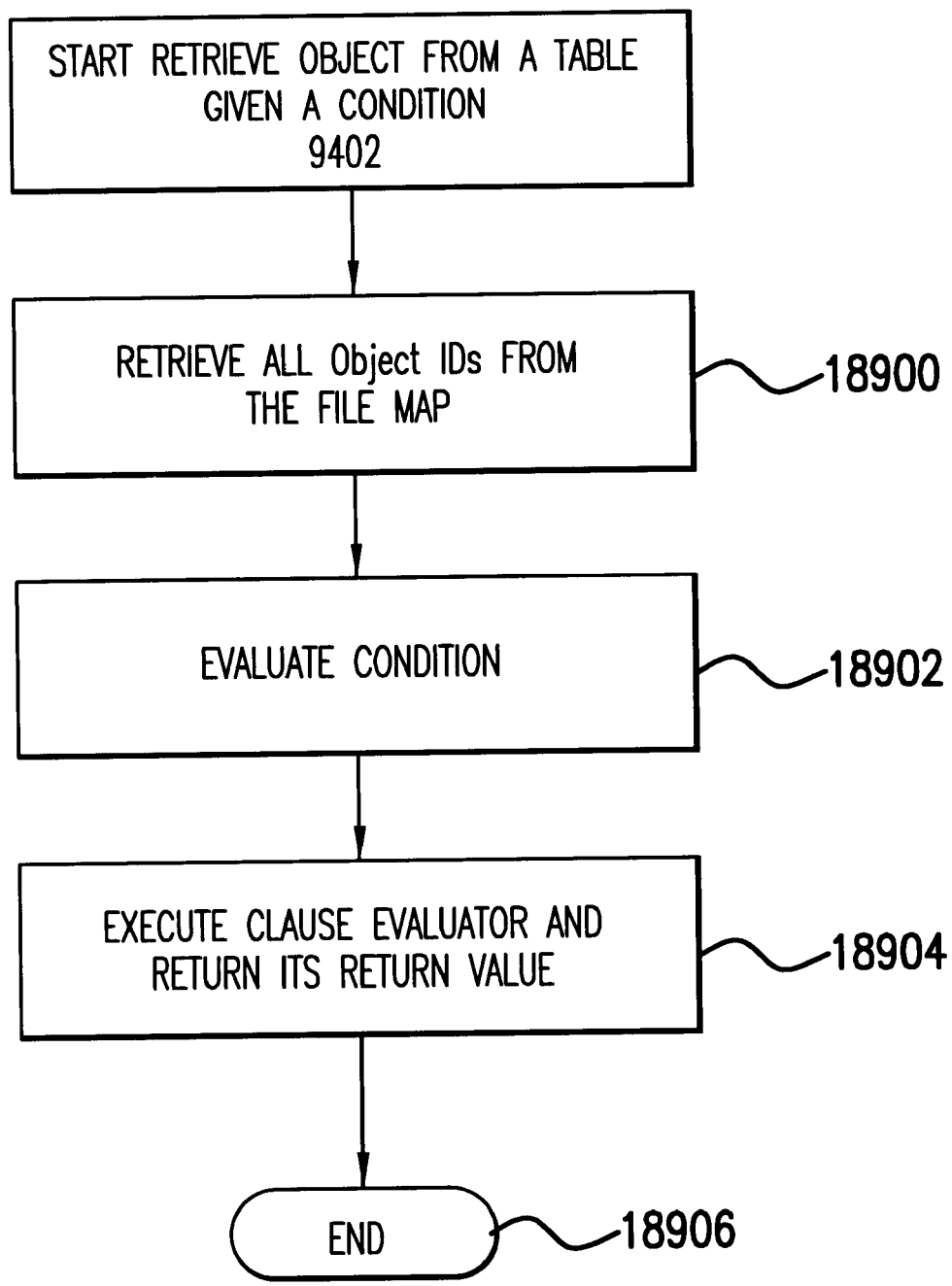
FIGS. 18A–18D illustrate an exemplary embodiment step 9402 of FIG. 9.
Figure 18B:
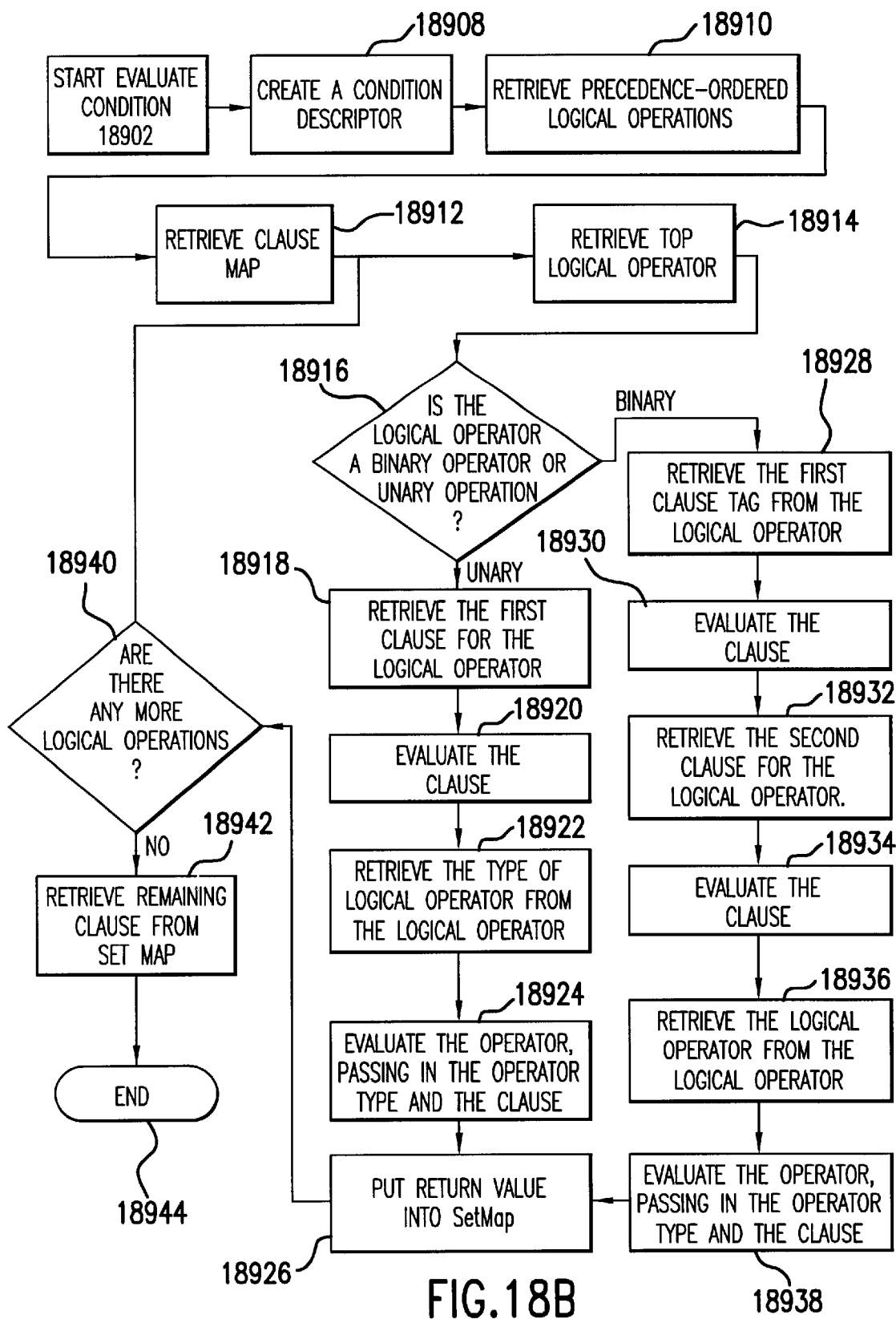

FIG. 18B illustrates an exemplary embodiment of the evaluate condition step 18902 of FIG. 18A. In step 18908, a condition descriptor is created. The condition descriptor includes an operations vector which sorts and stores the logical operations (e.g., boolean operators) of the condition by precedence (e.g., following an order of operations). In addition, the condition descriptor includes a clause map. The clause map associates clause tags (i.e., a unique identifier which identifies each clause inside of a multiple condition, for example "All people greater than 10 years old" AND "All people with brown hair" would be represented as A AND B, where A and B are clause tags) with actual clauses. In step 18910, the logical operations (in order of precedence) are retrieved. In step 18912, the clause map is retrieved. In step 18914, the top logical operation is retrieved. In step 18916, the logical operation is evaluated to determine if it is unary (e.g., NOT) or binary (e.g., AND or OR). If it is unary, in step 18918, the first clause tag is retrieved. In step 18920, the clause is evaluated returning a boolean value or a set of object IDs. In step 18922, the unary logical operator is retrieved and in step 18924, the clause and operator are evaluated together. The result of step 18924 is stored in a stack called SetMap in step 18926. The presence of additional logical operators is checked in step 18940. If there are no remaining logical operators then in step 18942, the value in the SetMap is retrieved and the procedure ends in step 18944.

If it is determined in step 18916, that the logical operator is a binary operator (e.g., AND or OR), then the first clause tag is retrieved in step 18928. In step 18930, the clause is evaluated and in step 18932, the next clause tag is retrieved. In step 18934, the clause associated with the next clause tag is evaluated and in step 18936 the binary logical operator is retrieved. In step 18938 the binary operation is evaluated using the results of step 18930 and step 18934 with the operator retrieved in step 18936. The result of step 18938 is stored in the SetMap in step 18926 and the procedure continues to step 18940 as described above. If, in step 18940, it is determined that there are more logical operators in the operations vector, then the procedure returns to step 18914.

Figure 18C:
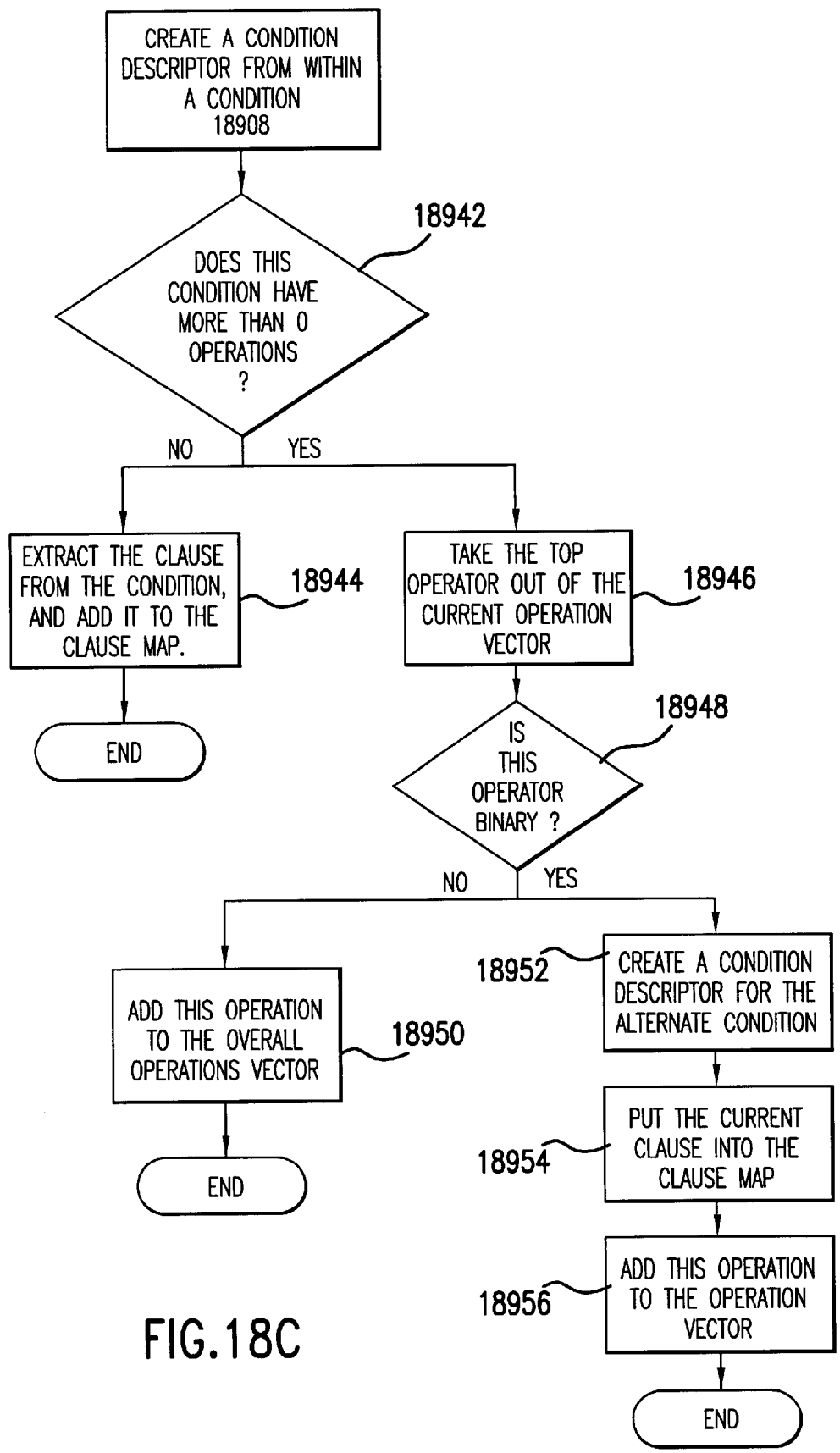

FIG. 18C illustrates an exemplary embodiment of the create a condition descriptor step 18908 of FIG. 18B. In step 18942, it is determined if the condition has more than zero operations. If the condition does not include more than zero operations, then the clause is extracted from the condition, assigned a unique ID, and added to the clause map in step 18944. If the condition does include more than zero operations, then the top operator is retrieved from the operation vector in step 18946. In step 18948, a determination is made if the operator is a binary operator. If the operator is not a binary operator (i.e., a unary operator), then the operator is added to the operation vector in step 18950. If the operator is a binary operator, then in step 18952, a condition descriptor is created for the second condition of the binary operator by using the above procedure of FIG. 18C to recursively create condition descriptors. In step 18954, the clause is placed in the clause map and in step 18956, the operator is placed in the operation vector.

Figure 18D:
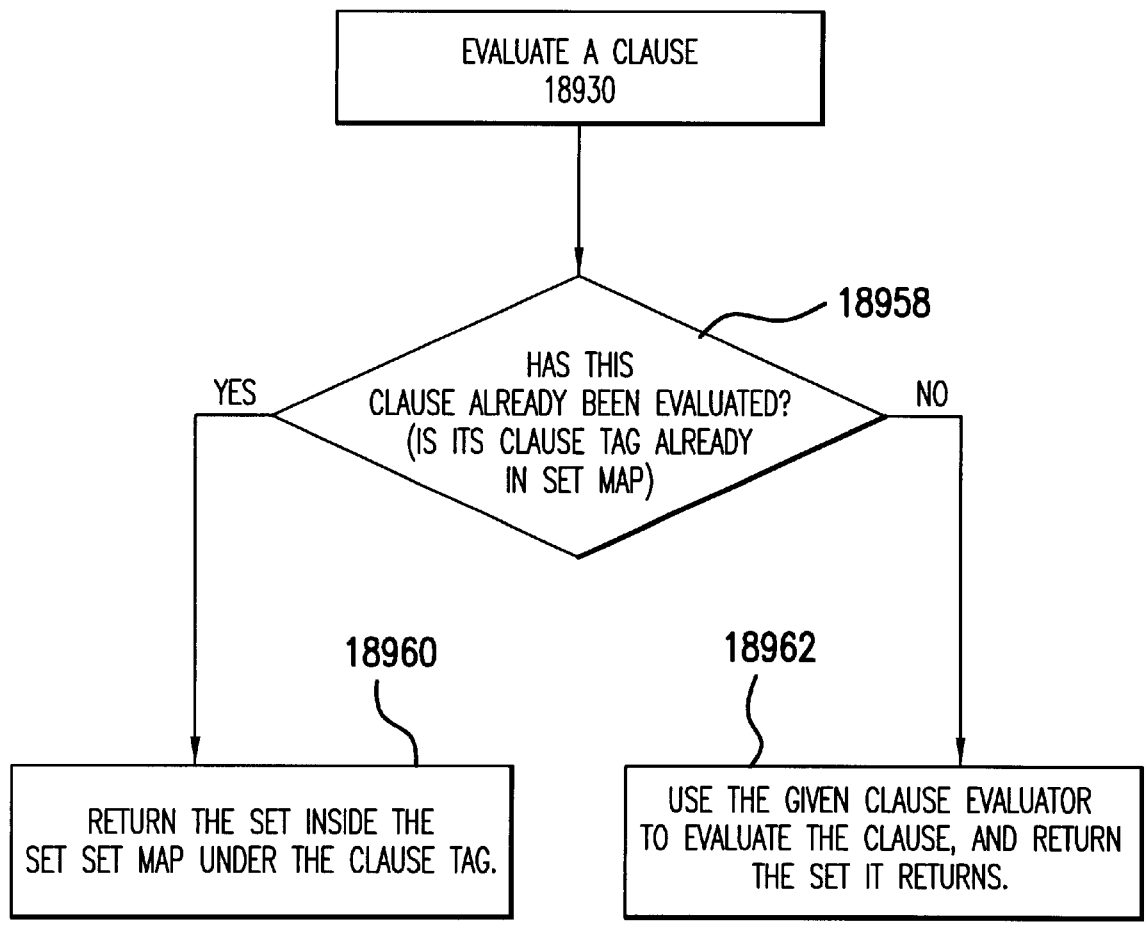

FIG. 18D illustrates an exemplary embodiment of the evaluate clause step 18930 (also steps 18920 and 18934). In step 18958, it is determined whether or not the clause has already been evaluated and stored in the SetMap by a previous evaluation step. If so, then in step 18960, the value of clause stored in the SetMap is returned. If the clause has not already been evaluated, then in step 18962, the clause is evaluated by comparing the condition of the clause (e.g., all people older than 10) with the entries of a corresponding indices for an appropriate table (e.g., an age index table for a person object).

Figure 10:
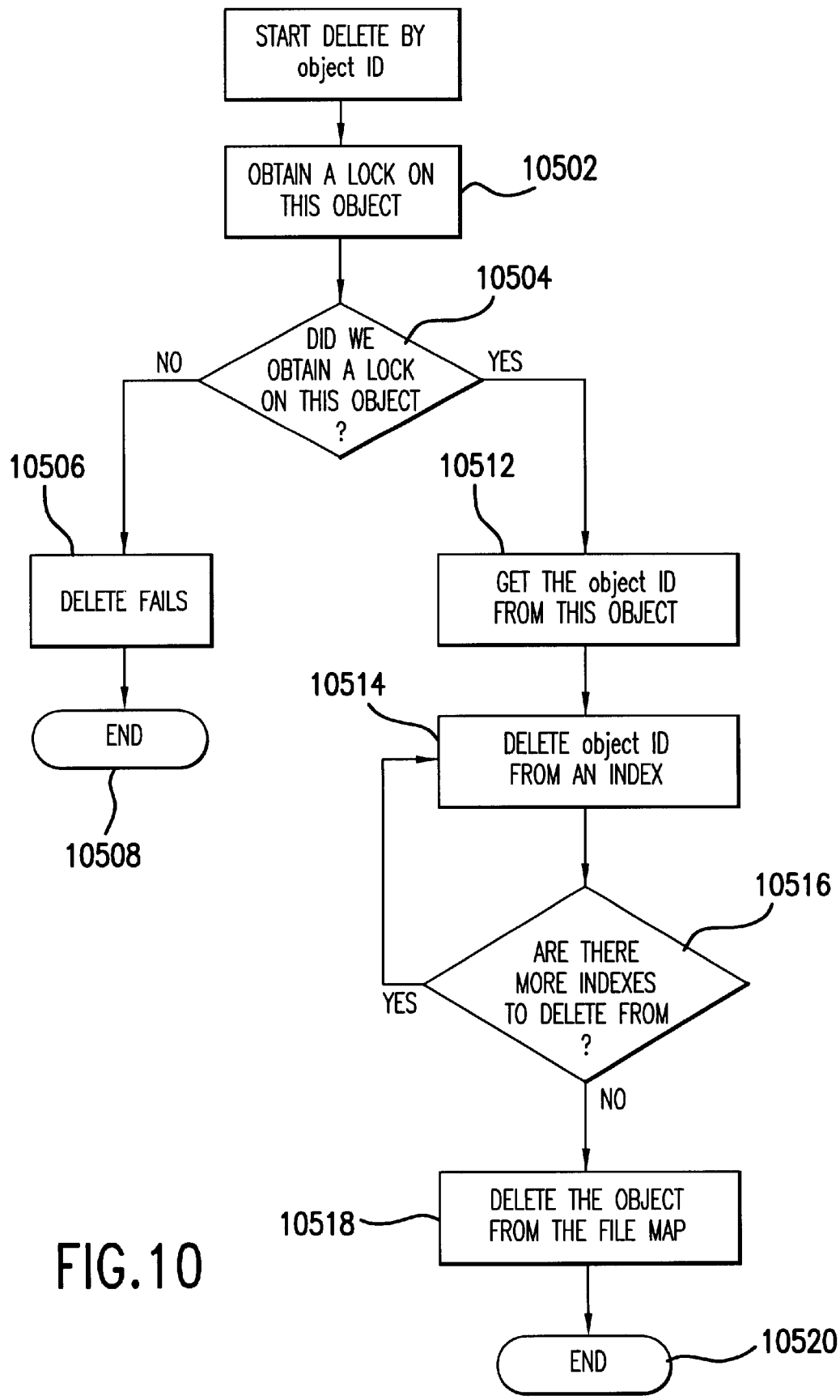
FIG. 10 illustrates an exemplary embodiment of a procedure for deleting an object by its object ID according to the present invention.

FIG. 10 illustrates an exemplary embodiment of a procedure for deleting an object by its object ID. In step 10502, a lock is placed on the specified object to be deleted. In step 10504, the object database manager 108 determines whether or not a lock was successfully placed on the identified object. If the lock was not successfully obtained, the delete fails, an error message is generated at step 10506 and the procedure ends at step 10508. If a lock was successfuilly placed on the object, then in step 10512, the object ID is extracted from the object. In step 10514 and step 10516, the object ID is deleted from each of the indices. If there is more than one object ID associated with an index value for the object in the index, only that object ID is deleted from the index. If there is only one object ID associated with the index value in the index, the index value is also deleted, so that the entire index entry is deleted. Step 10514 is described below with respect to FIG. 12. In step 10518, the object is deleted from the database in which it is stored in the random access file and the procedure ends at step 10520.

Figure 19D:
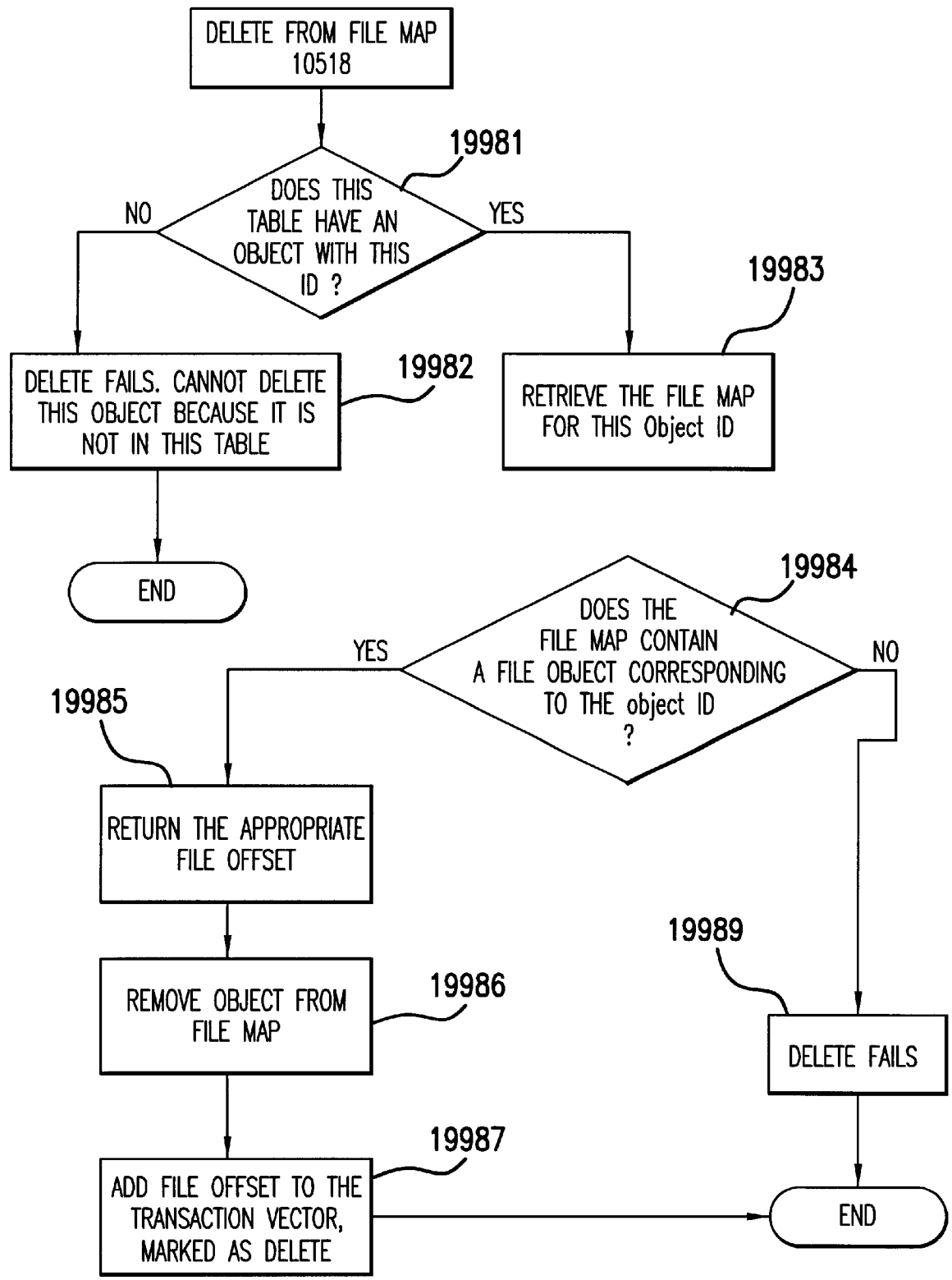
FIG. 19D illustrates an exemplary embodiment of step 10518 of FIG. 10.

At step 10518, once an object is deleted from a table and the indices are changed to reflect the removal of the object, it is necessary to delete the object from the file map and allocate its location in the random access file as free space. First, the file offset is obtained for the object ID from file map. The file map is then modified to indicate that the sectors or byte locations that were previously assigned to storing the deleted object are now available sectors or byte locations. This can be accomplished, for example, by designating the sectors previously assigned to the object in a separate heading in the file map as free space. FIG. 19D illustrates an exemplary embodiment of the delete from file map step 10518 of FIG. 10. In step 19981, it is determined if the table has an object with the specified ID. If not, then an error message is returned in step 19982. If the specified object is found in the table, then in step 19983, the file map for the table containing the specified object is retrieved. In step 19984, it is determined if the file map contains a file offset (or pointer) corresponding to the object ID of the specified object. If no file offset can be found, then in step 19989, an error message is returned and the delete procedure is aborted. If a corresponding offset is found, then in step

19985, the file offset is returned. In step 19986, the disk map entry for the object is removed and the space used in the random access file is indicated in the file map as free space. In step 19987, a log of the changes made to the indices in step 10514 of FIG. 10 is stored in the transaction vector.

Figure 11:
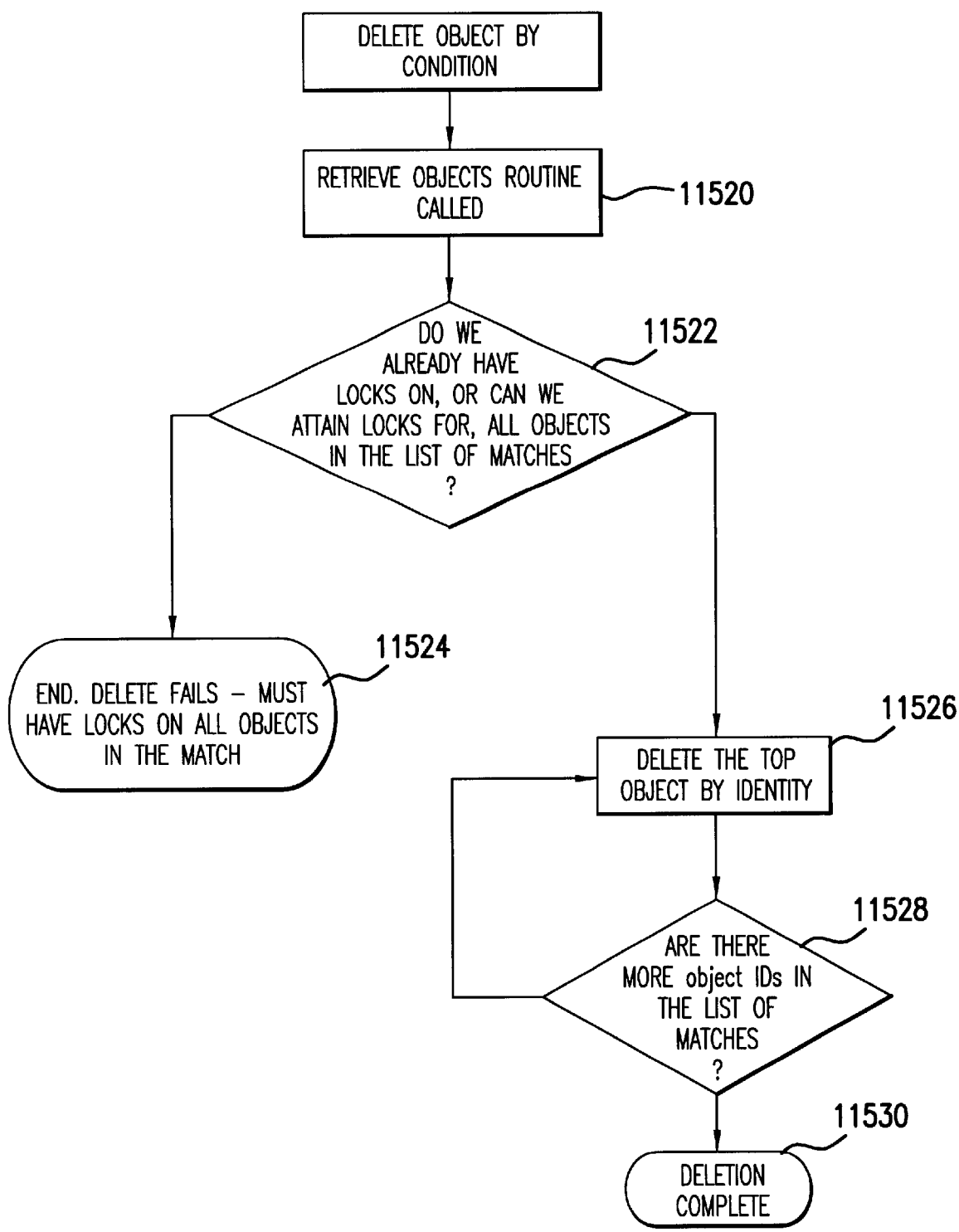
FIG. 11 illustrates an exemplary embodiment of a procedure performed by the object database manager for deleting an object based on a condition according to the present invention.

FIG. 11 illustrates the procedure performed by the object database manager 108 for deleting an object based on a condition. The procedure illustrated in FIG. 9 is used to return a list of objects which match a specific condition at step 11520. In step 11522, the object database manager 108 verifies that locks have been placed on all of the objects returned by the condition. If locks cannot be established on any of the listed objects, in step 11524, the delete object by condition fails and an error message is produced and the procedure ends. If, however, locks can be established on all of the listed objects, then in steps 11526 and 11528, each of the objects are deleted by object ID, using the routine illustrated in FIG. 10, until there are no more object IDs in the list of matches from the condition. This procedure ends at step 11530.

Figure 12:
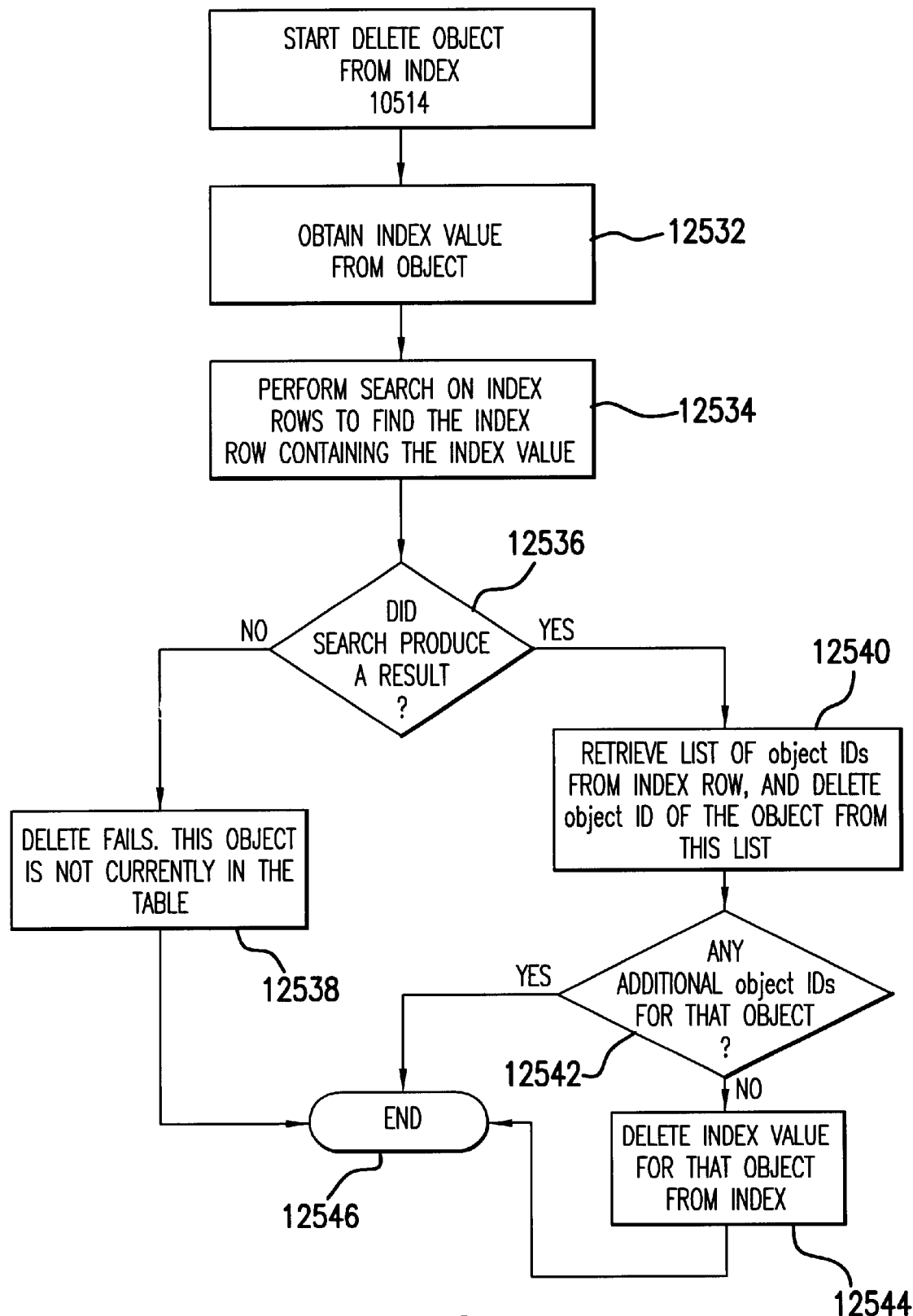
FIG. 12 illustrates an exemplary embodiment of step 10514 in FIG. 10.

After an object is deleted from a table, it is necessary to update the indices to reflect the change. In FIG. 12, an exemplary embodiment of a procedure for deleting an object from an index called at step 10514 in FIG. 10 is illustrated. In step 12532, a file offset from the file map for the deleted object is determined. In step 12534, a search, for example a binary search, on the index is performed to find the first index row which contains the index value. If, in step 12536, an index is found which matches the index value, then in step 12540, the object ID is removed from the index. In addition, if after removing the object IDs from the index, there are no additional object IDs which are associated with the particular index value at step 12542, then the index value is also removed from the index at step 12544 and the procedure ends as step 12546. If there are additional object IDs, the procedure ends at step 12546 without deleting the index row. If a match, was not found in step 12536, the delete operation fails because the object is not currently in the table, an error message is generated at step 15238, and the procedure ends in step 12546.

Figure 13A:
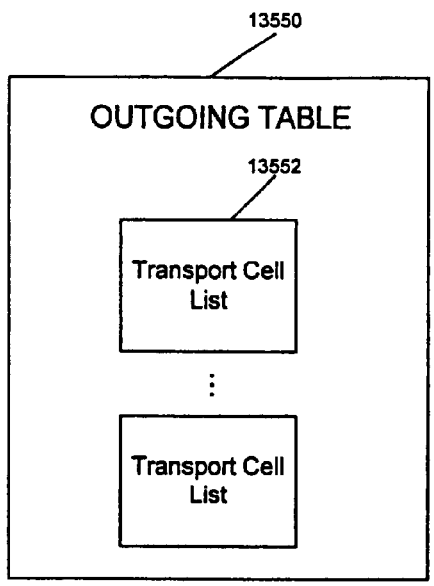
FIG. 13A illustrates an outgoing table according to an exemplary embodiment of the present invention.
Figure 13B:
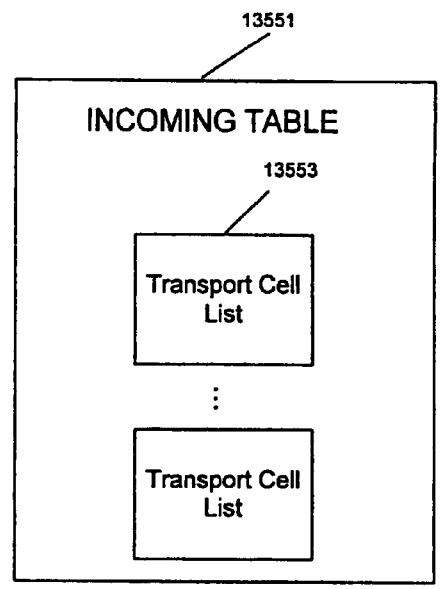
FIG. 13B illustrates an incoming table according to an exemplary embodiment of the present invention.
Figure 13C:
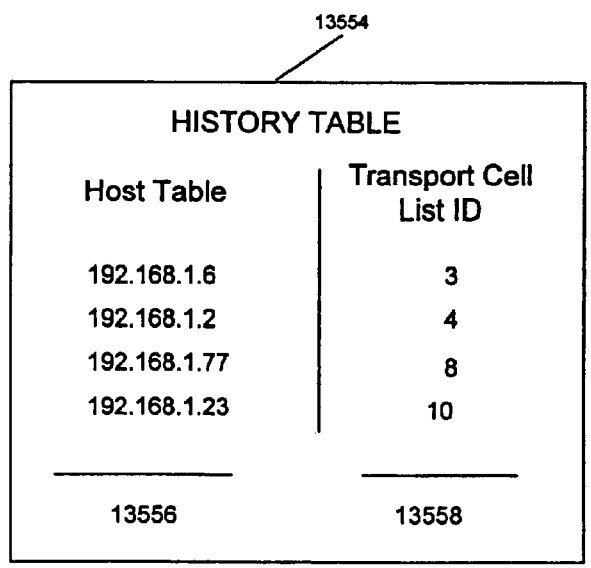
FIG. 13C illustrates a history table according to an exemplary embodiment of the present invention.
Figure 13D:
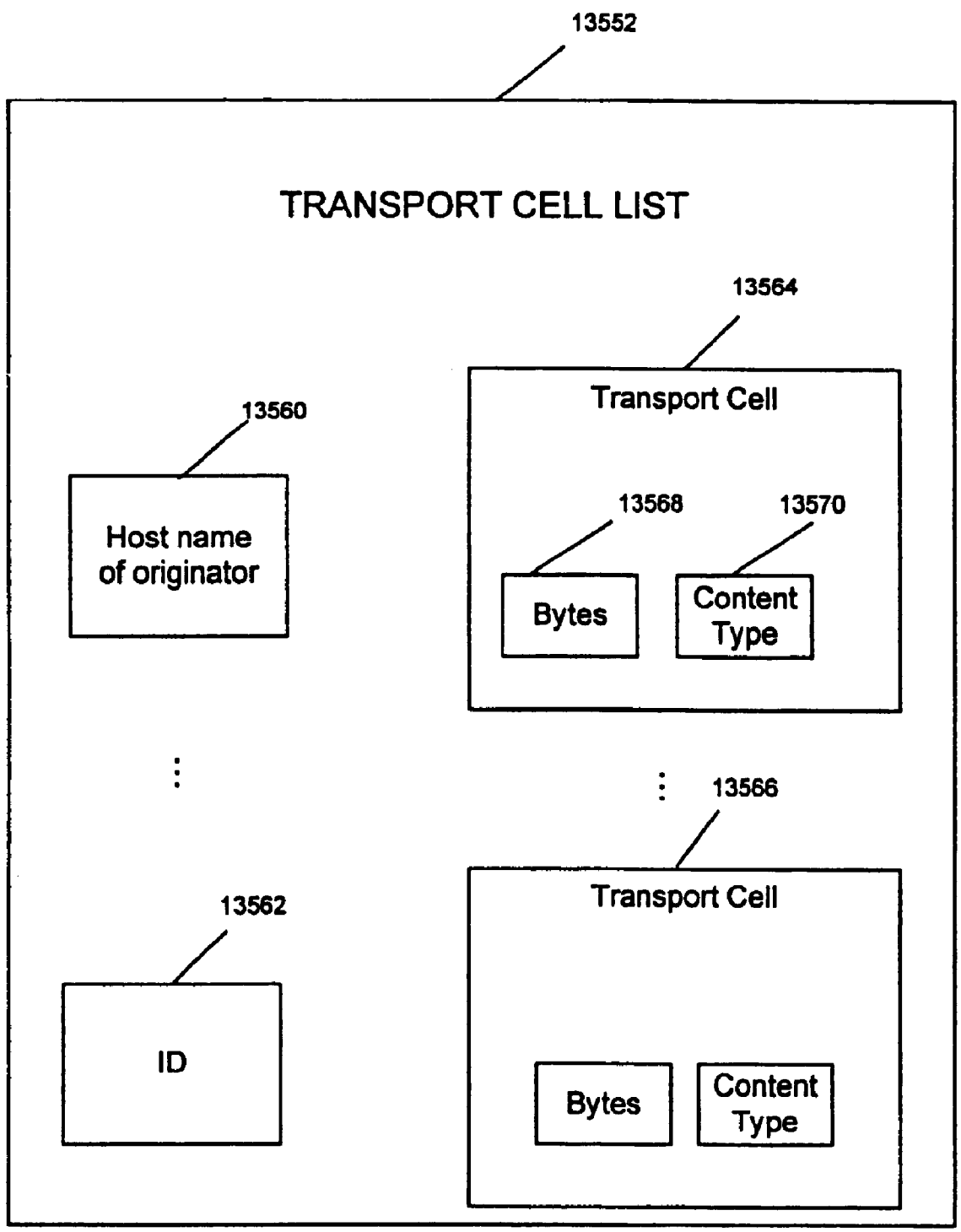
FIG. 13D illustrates a transport cell list according to an exemplary embodiment of the present invention.
Figure 14:
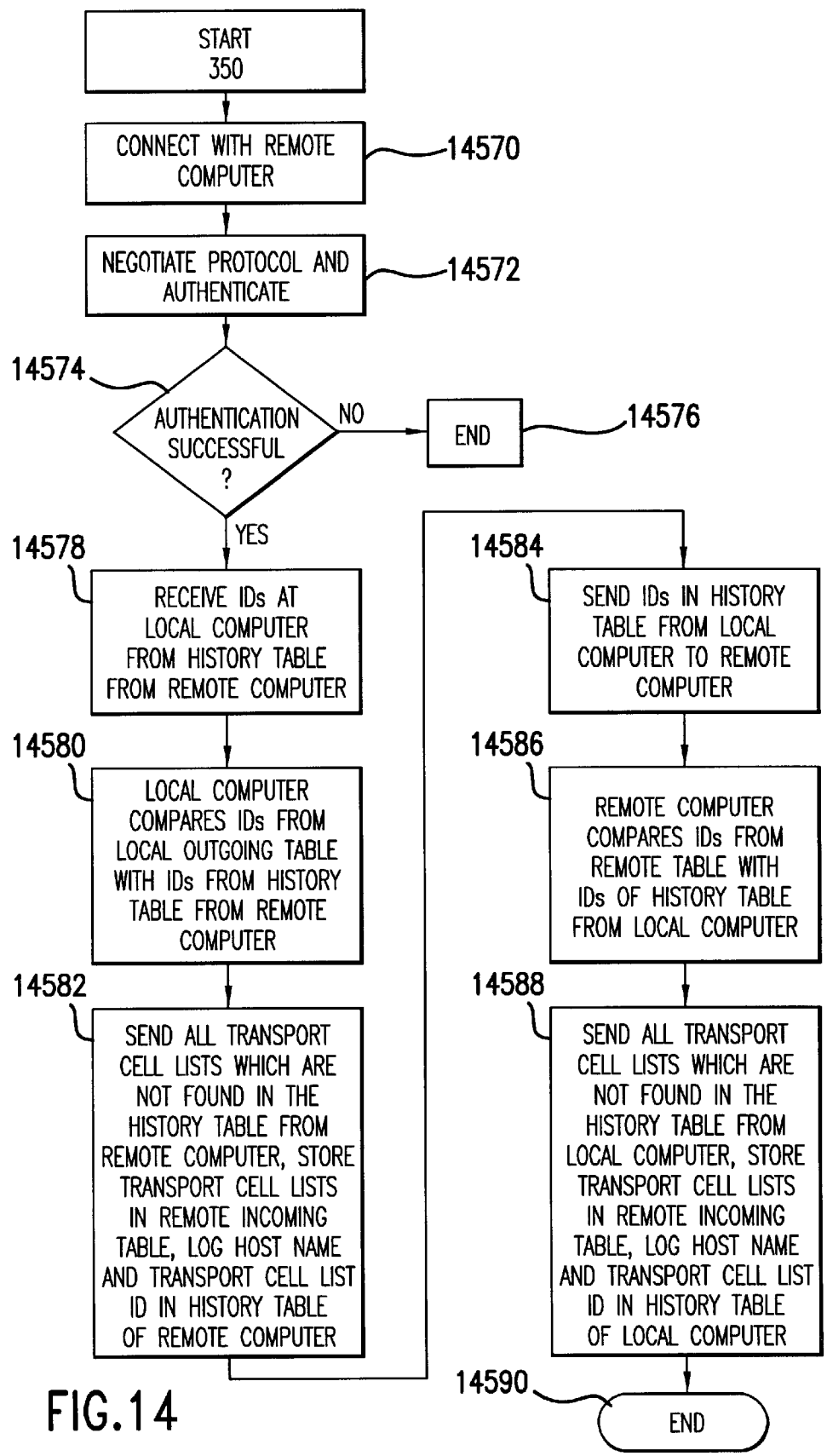
FIG. 14 illustrates an exemplary embodiment of the procedure by which one computer sends data to another computer to which it is connected according to the present invention.

FIGS. 13–14 illustrate an exemplary embodiment of the mechanism by which one computer sends data to another computer to which it is connected according to the present invention. This procedure is used, for example, to download new objects which are associated with an application module, from a network computer 100 to one or more client computers 101. The procedure can also be used to pass data files or objects between the network computer 100 and one or more client computers 101, or between two or more client computers. According to one exemplary embodiment, the updating procedure of FIG. 14, which is part of the update procedure 230 of FIGS. 2 and 3, will run in the background when the client computer 101 first logs on to the network. Alternatively, the user running an application module, or the application module itself, can trigger an update by which information is transferred to a remote computer (either the network computer 100 or another client computer 101). In addition, an update may be triggered by a timer by requiring the client computer 101 to connect with a network computer 100 if a predetermined amount of time has passed (e.g., after five days) without a connection.

With respect to FIGS. 13A–13D, when a user or application desires to send data (e.g., objects, class files, byte handlers, or other types of data) to a remote location, such as a remote computer, a transport cell list 13552 is placed in an outgoing table 13550. The outgoing table 13550 is a one dimensional table containing an identifier representing the files containing at least one transport cell list. As illustrated in FIG. 13D, each transport cell list 13552 includes, for example, a unique host name identification 13560, a unique (to the sending computer) transport cell identification number, and at least one transport cell (13564 or 13566). Each transport cell 13564, 13566 includes a string of one or more bytes 13568 which represent, for example, an object, a class file, a byte handler, or other data and a content type field 13570 which indicates the type of bytes, for example, whether the bytes represent a class file, an object, a byte handler, or any other data. The outgoing table is stored in the database and is accessed by the database gateway 112 when the update procedure of FIG. 14 is running.

Once data has been transferred to a remote site, it is stored in an incoming table 13551 at the remote computer. In particular, the browser running at the remote computer creates an incoming table 13551 which includes at least one transport cell list 13553 containing the identical content of the received transport cell list 13552. To avoid receiving the identical transport cell list from the same computer twice, the local computer and the remote computer stores a history table 13554. This history table 13554 stores the hostname 13560 (in column 13556) where the transport cell list originated and the transport cell list identification 13562 (in column 13558) for each transport cell list appearing in each incoming table 13551 received from another computer. Upon completion of the update procedure, the browser then evaluates each of the transport cells 13564, 13566 in each transport cell list 13553 stored in the incoming table and where appropriate installs the bytes 13568 on the remote computer using byte handlers based on the value of the content type field 13570. This is described more fully below with respect to FIG. 14.

FIG. 14 is a flow chart of an exemplary operation of step 350 of FIG. 3 which performs the updating of the computer using the tables of FIGS. 13A–13D. In step 14570, a connection to a remote computer is initiated by the local computer. For ease of understanding, reference is made here to local and remote computers. The location of the remote computer (e.g., the IP address) can be stored in the global settings module 106 or alternatively can be entered by an application or a user. In step 14572, the communication protocol is negotiated between the local and remote computer and an optional authentication procedure is commenced. Examples of different protocols include an "update" service, a "request application module" service, a "status check" service, or a secure "commerce" service. Authentication can include sending a username and password and/or a hostname of the local computer to the remote computer. In step 14574, the remote computer sends an acknowledgment of a successful or unsuccessful authentication. If authentication is not successful, the procedure is terminated in step 14576. If authentication is successful, then in step 14578, the transport cell list identifications associated with the local computer's hostname in the remote computer's history file table are sent to the local computer. In step 14580, the local computer compares the received transport cell list identifications with the transport cell list identification fields of each of its transport cell lists in its outgoing table. After the comparison, in step 14582, the local computer sends all transport cell lists which do not match a transport cell list identification received from the remote computer. The remote computer stores each of the transport cell lists in the remote computer's incoming table and logs the hostname and transport cell list identification fields in its history table. In step 14584 the local computer sends the transport cell list identifications associated with the hostname of the remote computer. This process is now reversed so that the remote computer can send data to the local computer. In step 14586, the remote computer compares received transport cell list identifications from the local computer and compares them with the transport cell list identifications in the remote computer's outgoing table. After the comparison, in step 14588, the remote computer sends all transport cell lists which do not match the received transport cell list identifications from the local computer. The local computer stores each of the transport cell lists in the local computer's incoming table and logs the hostname and transport cell list identification fields in its history table. The update process is then completed in step 14590.

In an alternate embodiment of the present invention, both the local and remote computers can additionally set flags for each of the transport cell lists in their outgoing tables to designate specific destinations. For example, if the user of a local computer purchases a new application module (or part of a module), from a remote computer, the remote computer can set a flag in the transport cell list which will designate the local computer as an authorized recipient of the application module contained in the transport cell list. The flag can also represent a boolean expression (e.g., a condition) to be evaluated to determine whether or not the transport cell list should be sent to the local computer. If the flag is not set, or the expression evaluates to false, the transport cell list will not be sent.

In another alternate embodiment of the present invention, the entire contents of the history list is exchanged between the local and remote computers. Thereby, a remote computer may decide not to send a transport cell list if a predetermined transport cell list (identified by its identification field and hostname field) was already received by the local computer from another remote computer.

Figure 15A:
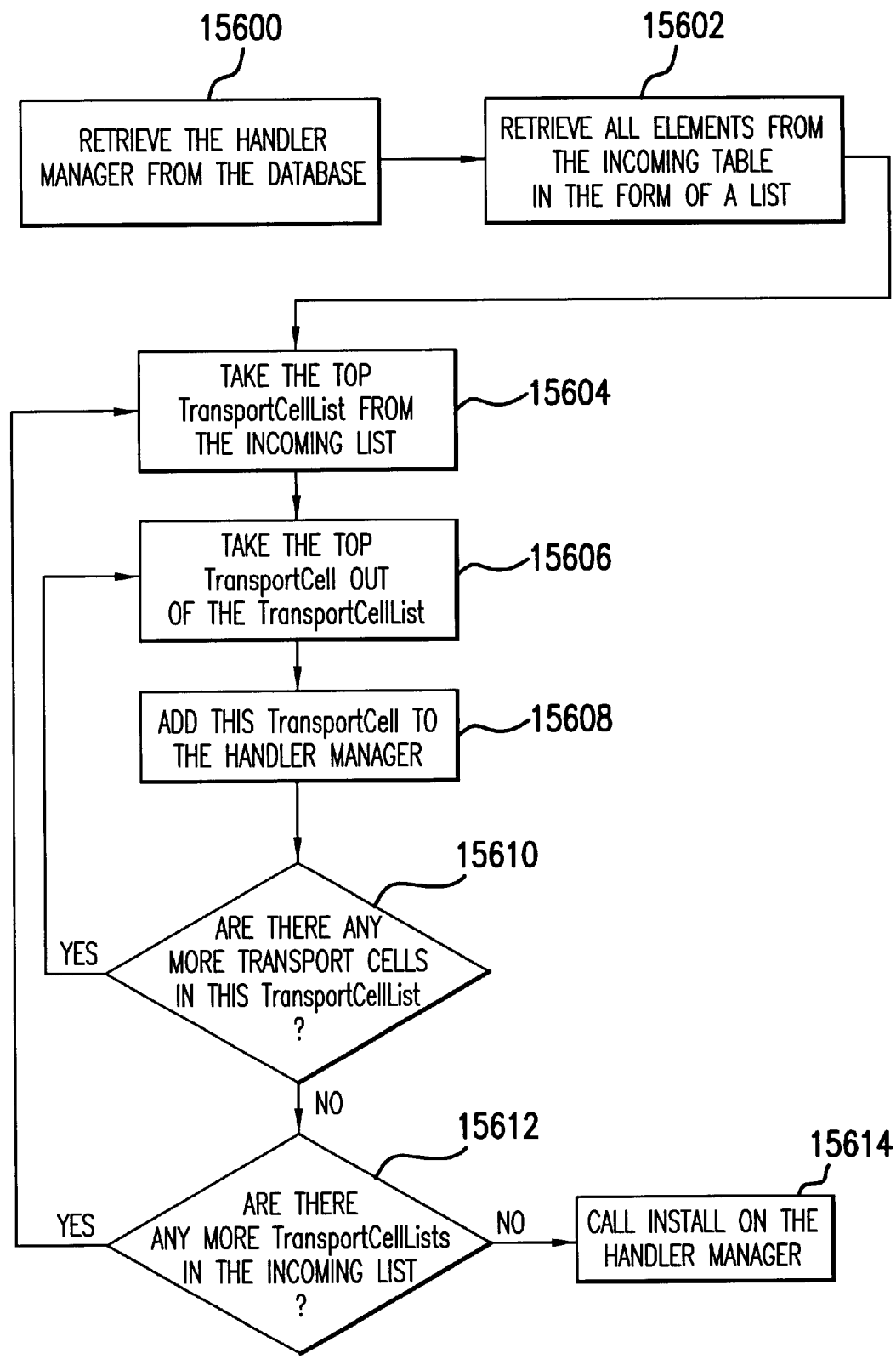
FIGS. 15A–15C illustrate an exemplary installation procedure of the present invention.
Figure 15B:
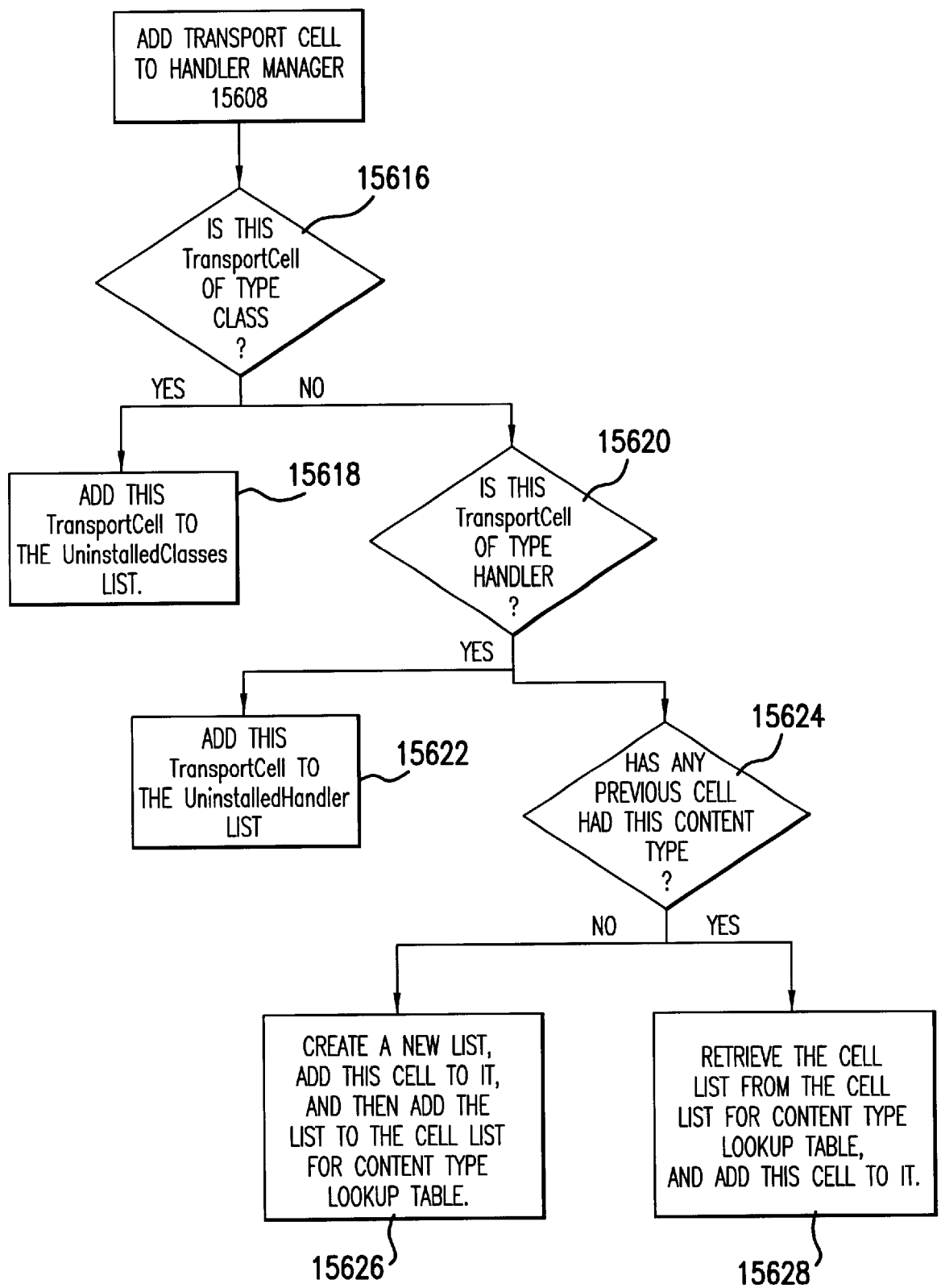
Figure 15C:
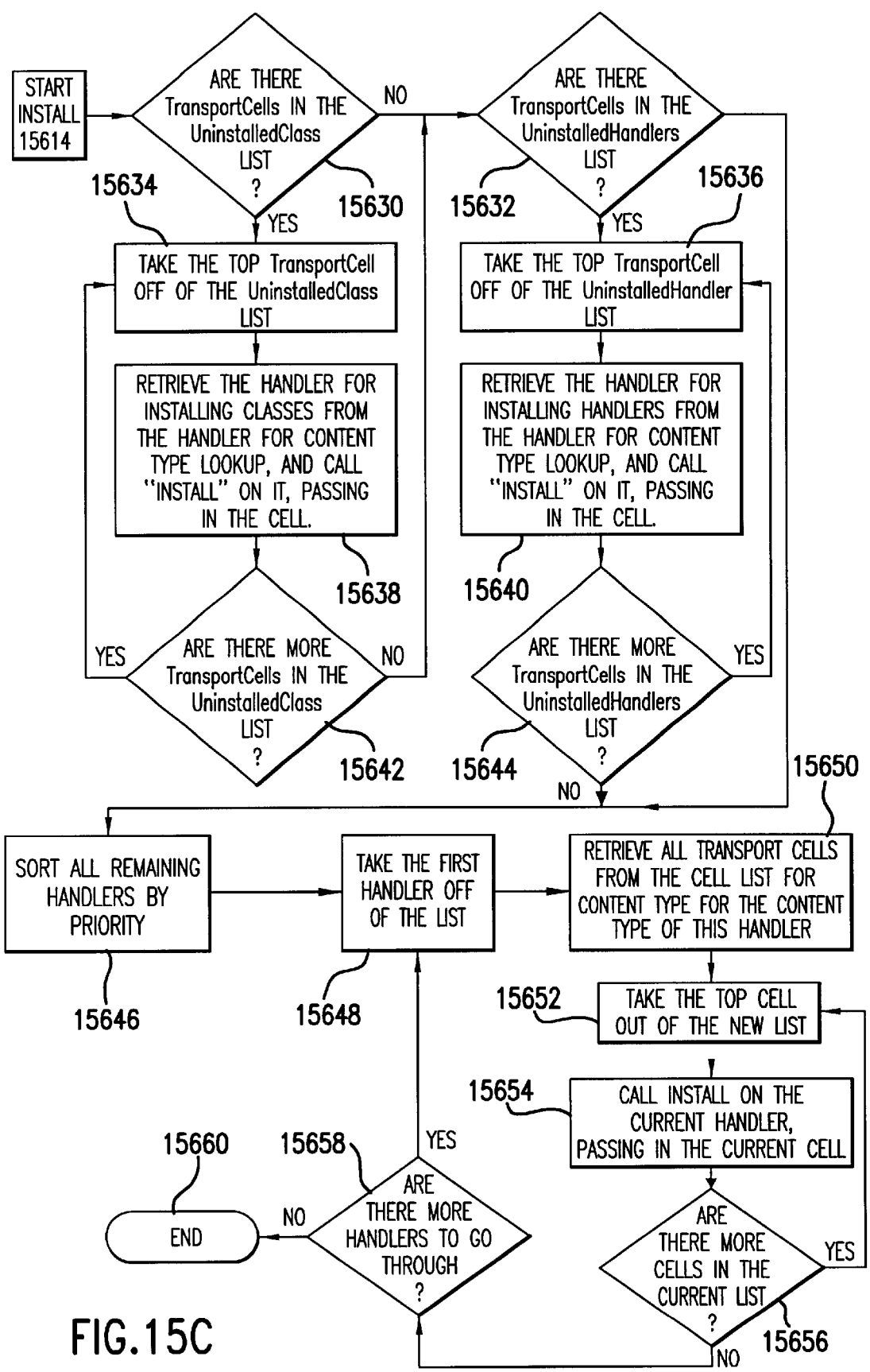

Once transport cell lists are placed in the incoming table, the contents of the transport cell lists are installed in both the local and the remote computers, FIGS. 15A–15C illustrate an exemplary installation procedure of the present invention. To install the bytes contained in the transport cells, a byte handler is used. The handler manager 109 is part of the object database manager 108. In an alternative embodiment of the present invention, the handler manager 109 is a separate module which interfaces with both the database gateway 112 and the update module 110. The byte handlers can be stored as objects in the databases 116, 117, 118, and are used by the handler manager 109 to apply the appropriate installation procedure for each possible content type 13570.

In step 15600, the handler manager 109 is activated. In step 15602, a list identifying all transport cell lists in the incoming table 13551 is retrieved by the handler manager 109 from the incoming table 13551. The first transport cell list 13552 is then retrieved by the handler manager 109 in step 15604. In steps 15606 and 15608, the first transport cell 13564 of the first transport cell list 13552 is retrieved by the handler manager. In step 15610, the handler manager 109 determines if there are any additional transport cells in the first transport cell list. If so, the procedure returns to step 15606 and retrieves the next transport cell. If not, the handler manager 109 determines if there are any additional transport cell lists. If so, then the procedure returns to step 15604 and retrieves the next transport cell list. If not, then the handler manager 109 installs each of the transport cells in step 15614, which is described below with reference to FIG. 15C.

FIG. 15B illustrates one embodiment of the process of step 15608 of FIG. 15A in greater detail. A purpose of the process shown in FIG. 15B is to separate transport cells of different content types so that classes can be installed first, byte handlers can be installed second, and all other content types can be installed in order of a predetermined priority. This procedure allows the present invention to avoid attempting to install a Java™ object before its appropriate class file has been installed. Similarly, this procedure allows the present invention to avoid trying to install bytes of a new content type before the corresponding byte handler has been installed.

Referring now to FIG. 15B, in step 15616, the handler manager 109 checks the content type field 13570 to determine if it is of type "CLASS" (i.e., a Java™ class file). If so, in step 15618, the handler manager 109 adds the transport cell to an uninstalled class transport cell list in memory or in the database. Otherwise, in step 15620, the handler manager 109 checks the content type field 13570 to determine if it is of type "HANDLER" (i.e., a byte handler). If so, in step 15622, the handler manager 109 adds the transport cell to an uninstalled handler transport cell list in memory or in the database. Otherwise, in step 15624, the handler manager 109 checks the content type field 13570 to determine if it is of any type used by any previous transport cell during the entire installation procedure of FIG. 15A. If so, in step 15628, the handler manager 109 adds the transport cell to an uninstalled transport cell list in memory or in the database corresponding to the known type. Otherwise, in step 15626, a new uninstalled transport cell list in memory or in the database is created corresponding to the type.

FIG. 15C illustrates an exemplary embodiment of step 15614 of FIG. 15A. The handler manager 109 references byte handlers which inform the handler manager how to install bytes of their respective content type. In step 15630, the handler manager 109 determines if there are any transport cells in the uninstalled class transport cell list. If so, in step 15634, the first transport cell is retrieved. In step 15638, the "class" byte handler is retrieved and the "class" byte handler installs the class file contained in the bytes field of the transport cell. In step 15642, the handler manager 109 determines if there are any more transport cells in the uninstalled class transport cell list in memory or in the database. If so, the procedure is returned to step 15634 for the next transport cell.

If there are no transport cells in the uninstalled class transport list (i.e., the result of step 15630 is no), or if there are no more transport cells in the uninstalled class transport cell list at step 15642, then in step 15632, the handler manager 109 determines if there are any transport cells in the uninstalled byte handler transport cell list. If so, in step 15636, the first transport cell is retrieved. In step 15640, the "byte handler" byte handler is retrieved and the "byte handler" byte handler installs the new byte handler file contained in the bytes field of the transport cell. In step 15644, the handler manager 109 determines if there are any more transport cells in the uninstalled byte handler transport cell list. If so, the procedure is returned to step 15636 for the next transport cell.

If there are no transport cells in the uninstalled byte handlers transport cell list (i.e., the result of step 15632 is no), or if there are no more transport cells in the uninstalled byte handler transport cell list in step 15644 then, in step 15646, the handler manager 109 sorts the remaining byte handlers by priority. The priority of a byte handler is contained in a flag which is received by the handler manager 109 as part of the byte handler. After sorting, the byte handler with the highest priority is retrieved in step 15648. In step 15650, all transport cells from the uninstalled transport cell list corresponding to the selected byte handler are retrieved. In step 15652, the first transport cell is retrieved and in step 15654, the corresponding byte handler is retrieved and installs the bytes contained in the bytes field of the transport cell.

In step 15656, the handler manager 109 determines if there are any more transport cells in the corresponding uninstalled transport cell list. If so, the procedure is returned to step 15652 for the next transport cell. If the result of step 15656 is no then, in step 15658, the handler manager 109 determines if there any additional byte handlers from steps 15646 and 15648. If so, then the next byte handler is retrieved in step 15648. Otherwise, the procedure ends in step 15660. If installation of all bytes was successful, the handler manager 109 calls a commit procedure to make the installation permanent. If, however, the installation of all bytes were unsuccessful, then the handler manager 109 (or a user who instructs the handler manager 109) calls a rollback to restore the database to the state it was in before the installation procedure commenced.

Figure 16A:
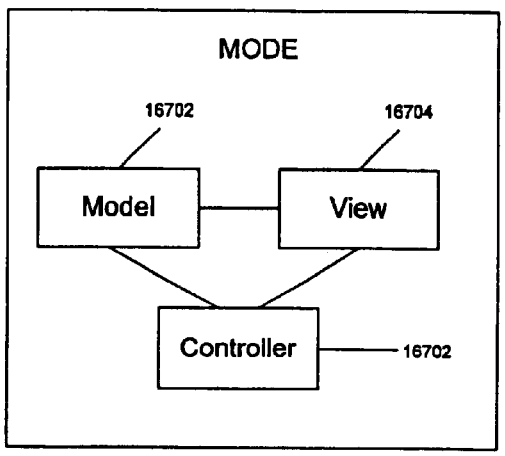
FIGS. 16A–16C illustrate exemplary structures of an application module of the present invention.
Figure 16B:
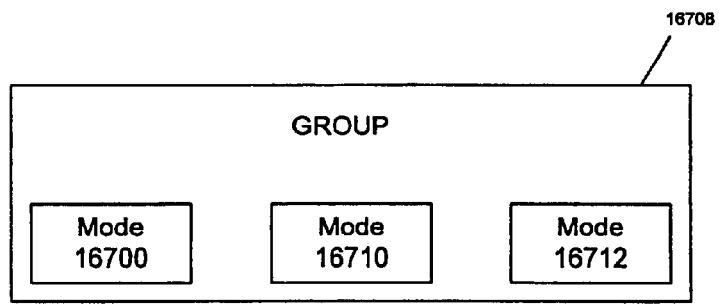
Figure 16C:
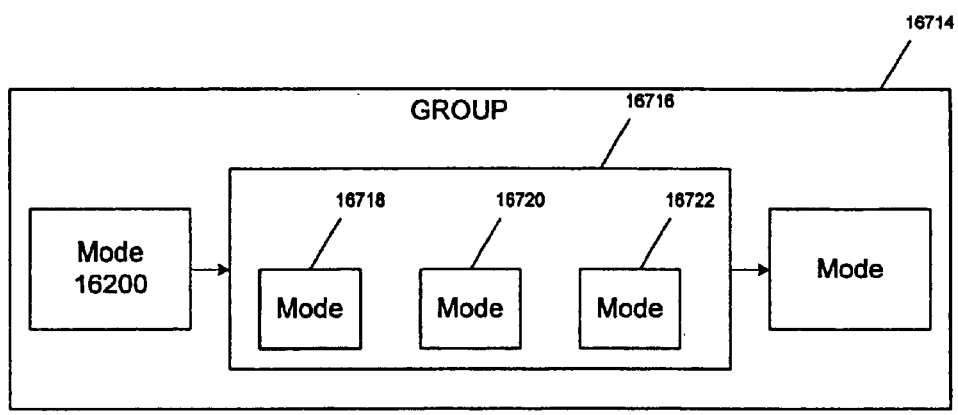

FIGS. 16A–16C illustrate exemplary structures of an application module 104 that can be included according to the present invention. In FIG. 16A, application module 104 includes at least one mode which typically includes a model 16702, a view 16704, and a controller 16706. In FIG. 16B, a series of modes 16700, 16710, 16712 can be linked in a group 16708. By linking modes 16700, 16710, 16712 in a group 16708, any of the models, views, or controllers of any of the linked modes 16700, 16710, 16712 can be shared or transferred from one mode to another. In addition, in FIG. 16C, a group 16714 can include a combination of modes 16700, 16718, 16720, 16722 and groups 16716 in series, thereby sharing model, view, and controllers between modes of different groups.

FIGS. 17A–17J illustrate an exemplary interactive educational system application module of the present invention. The exemplary interactive education system enables users to receive educational courses and other related information at the user's personal computer via updates received over a network (e.g., the Internet, a direct-to-server dial-in, or from a Intranet or Web site). The updates occur automatically each time the user runs the application while connected to the network. As a result, the user is provided an individualized educational portfolio that provides the user with faster, better information, and provides administrators immediate feedback on a user's needs and progress.

The application module includes a display 17800 having a profile button 17802, a library button 17804, a course button 17806, a notes button 17808, a glossary button 17810, a flashcard button 17812, a post-test button 17814, a final exam button 17816, a score button, 17818, a portfolio button 17820, a mailbox button 17822, and a quit application button 17824. In addition, a graphic 17826 is displayed which indicates the course presently selected by the user of the application module.

To allow users to operate the application module while disconnected from a network, the update procedure is performed during the startup module 102 if a network connection is available. If a network connection is not available, then the update procedure can be delayed for the next time the startup module 102 is activated. Alternatively, the startup module 102 or the application module 104 can monitor the client for the presence of a network connection and prompt for an update once a connection is detected. In addition, the startup module 102 or the application module 104 can initiate an update procedure at any time.

When the user activates the profile button 17802, the view changes to FIG. 17B allowing the user to enter his/her personal information in a profile/registration box 17828. Once the personal information is entered into the profile, the user activates the end profile button 17830 and the personal information is stored and placed in the outgoing table 13550 of the client computer to send to the educational server during the next update 230 of the system.

Figure 17A:
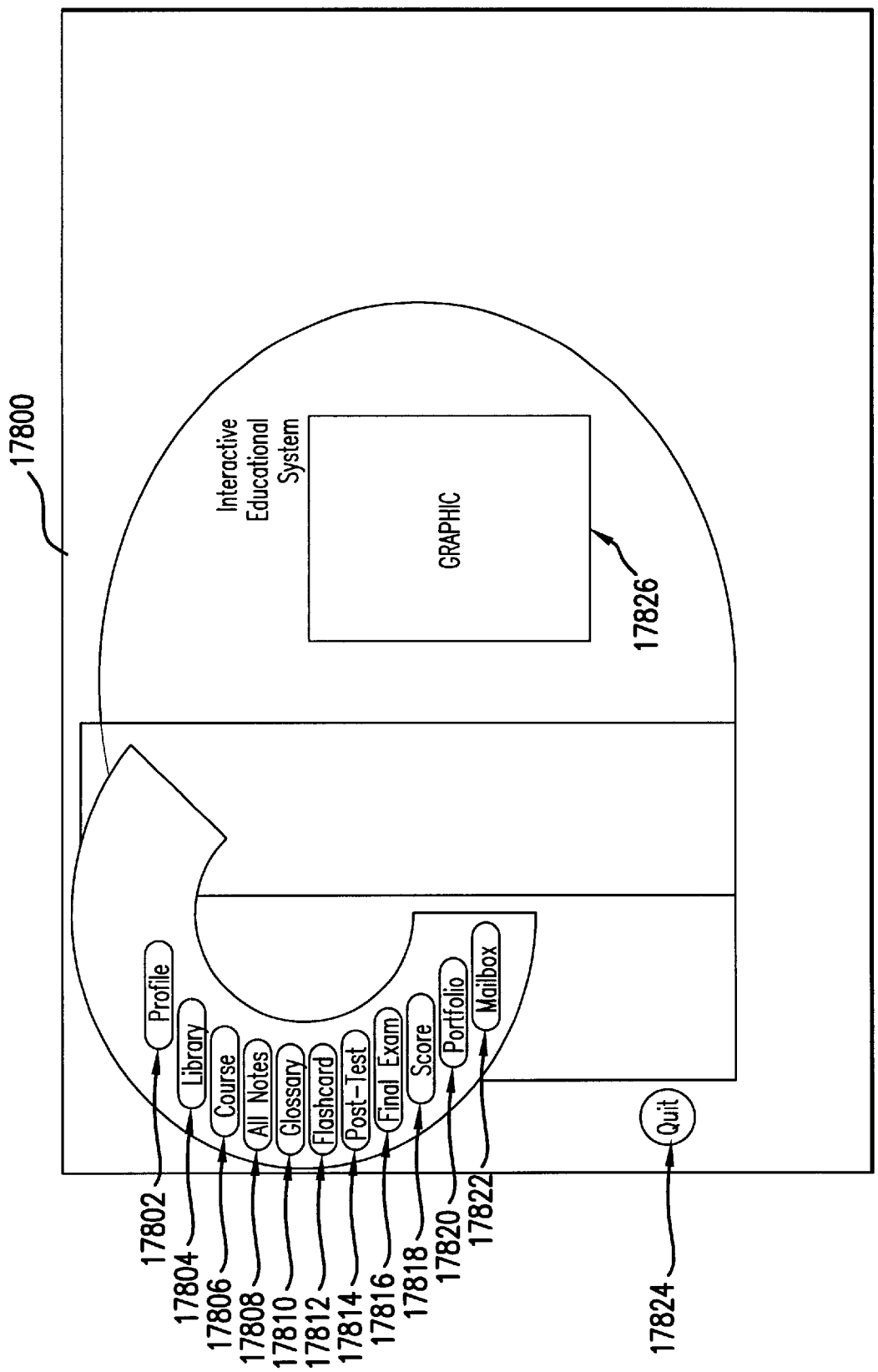
Figure 17C:
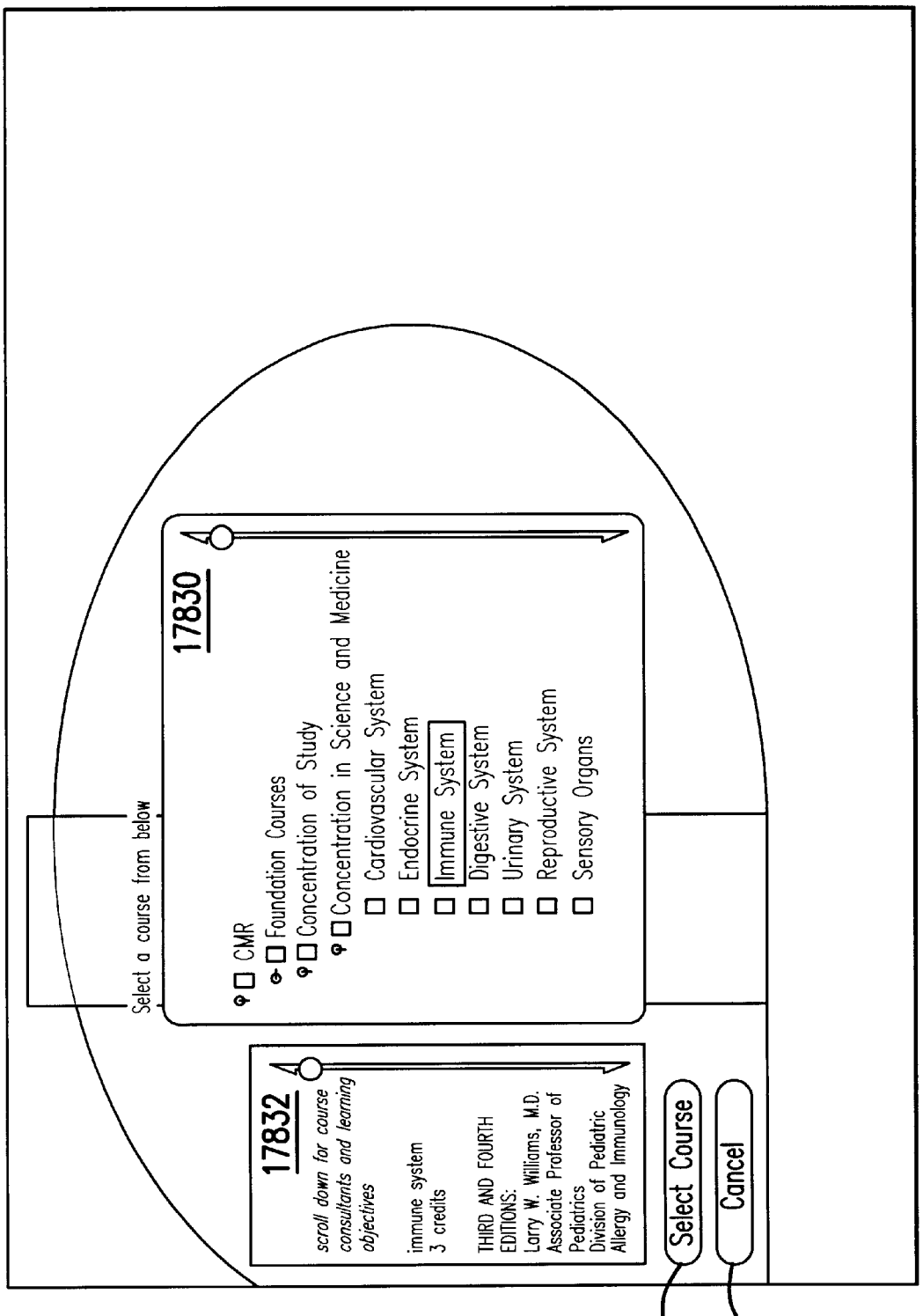

When the user activates the library button 17804, the view changes to FIG. 17C allowing the user to select the course from a course window 17830. A description of the selected course is displayed in a description window 17832 and the course selection is made final by activating the select course button 17834. If the user does not wish to select a course, the user can activate the cancel button 17836 returning the user to FIG. 17A.

Figure 17D:
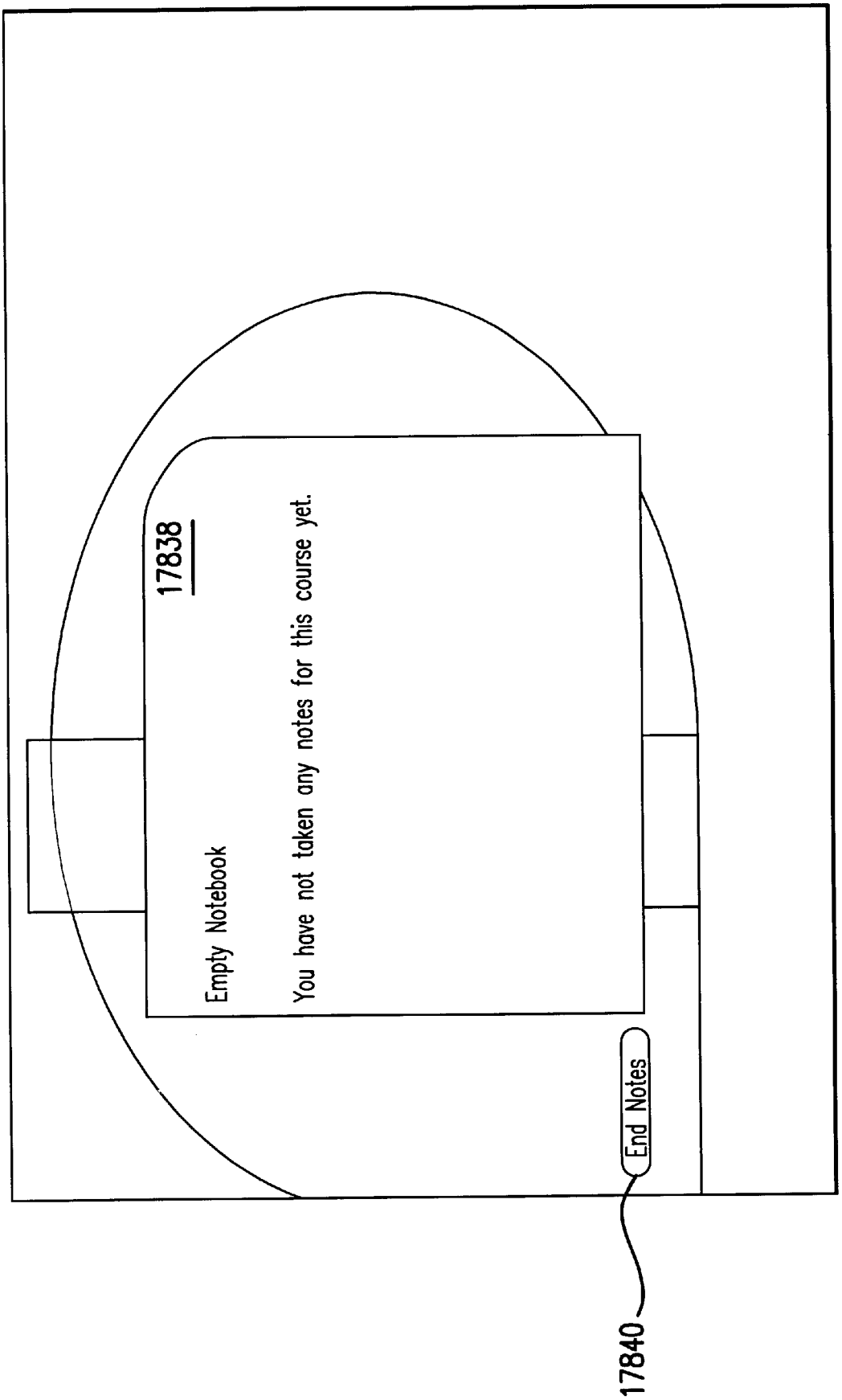

When the user activates the notes button 17808, the view changes to FIG. 17D allowing the user to view notes in a note window 17838. When the user is finished viewing his/her notes, the user activates the end notes button 17840 to return to FIG. 17A. In an exemplary embodiment of the present invention, notes can be entered in a note window available from an "enter notes" button located on any window where the user may desire to take notes (e.g., while viewing course material or flashcards).

Figure 17E:
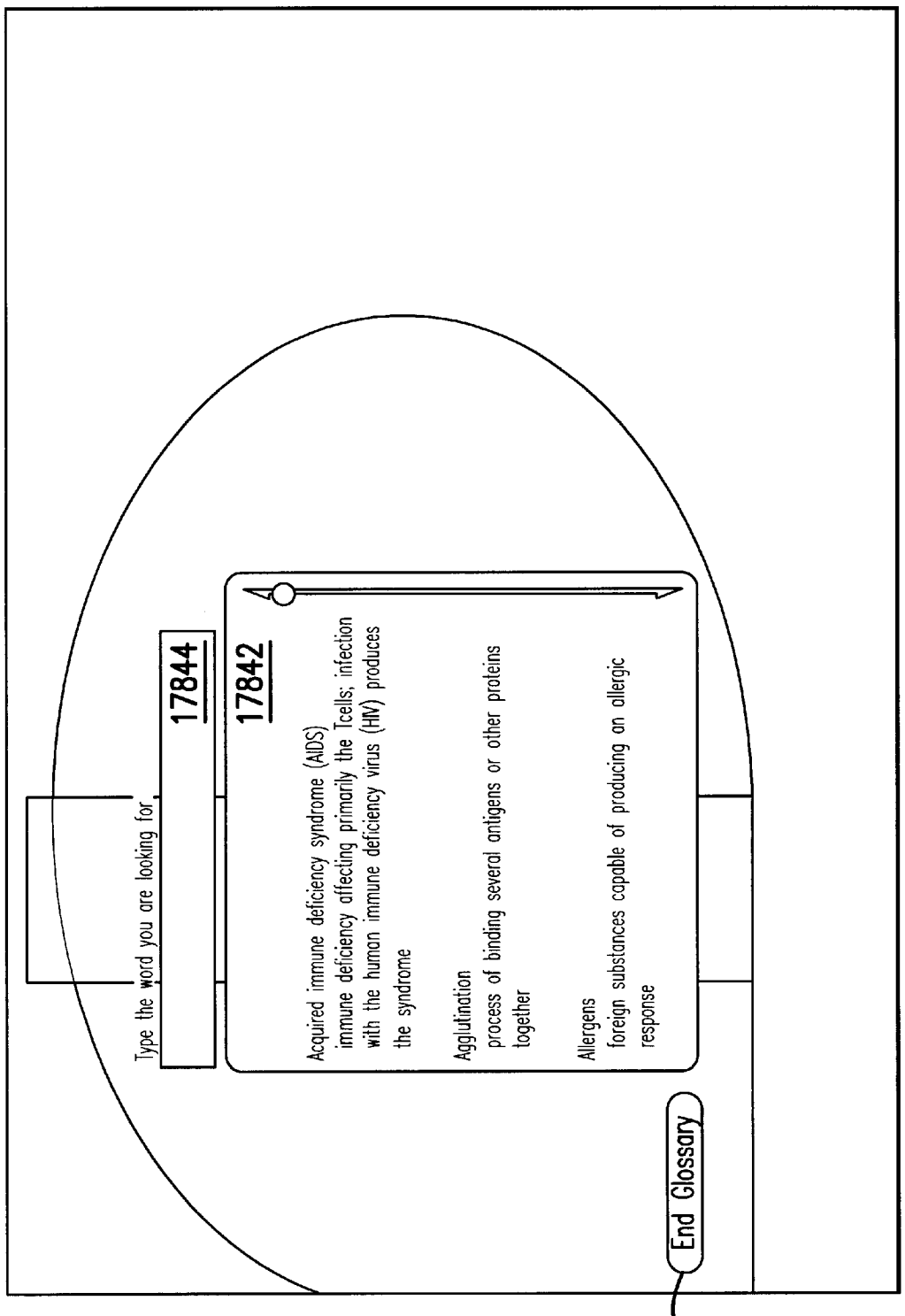

When the user activates the glossary button 17810, the view changes to FIG. 17E allowing a user to scroll through a list of glossary terms in the glossary window 17842. In addition, the user can search the terms of the glossary by entering a search term in the search window 17844. When the user is finished with the glossary, the user can activate the end glossary button 17846 and return to FIG. 17A.

Figure 17F:
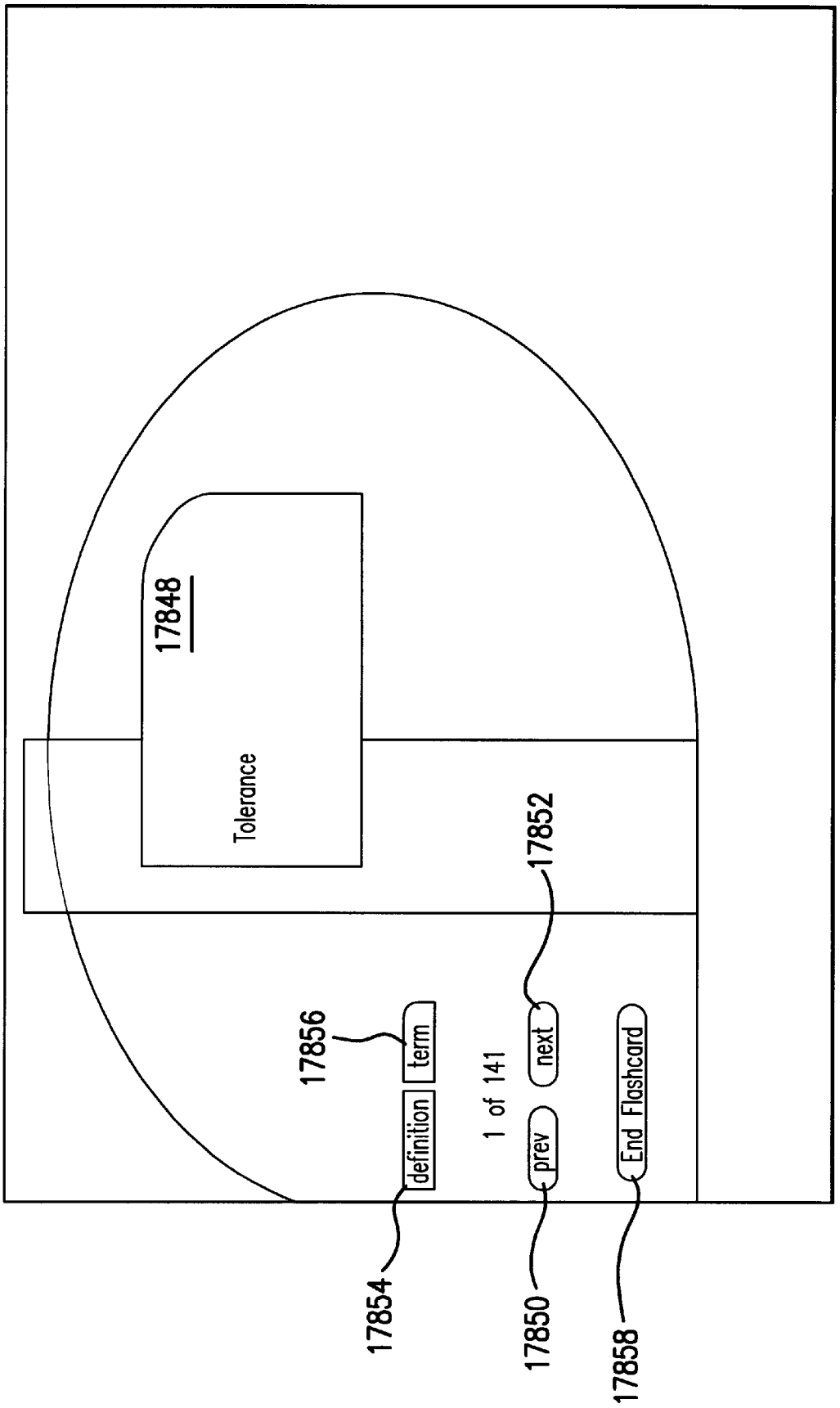

When the user activates the flashcard button 17812, the view changes to FIG. 17F allowing a user to select a flashcard 17848 with a term using the previous button 17850 and the next button 17852. The user can switch between a display of the term or its definition by activating the term button 17856 or definition button 17854, respectively. When the user is finished with the flashcards, the user can activate the end flashcard button 17858 and return to FIG. 17A.

Figure 17G:
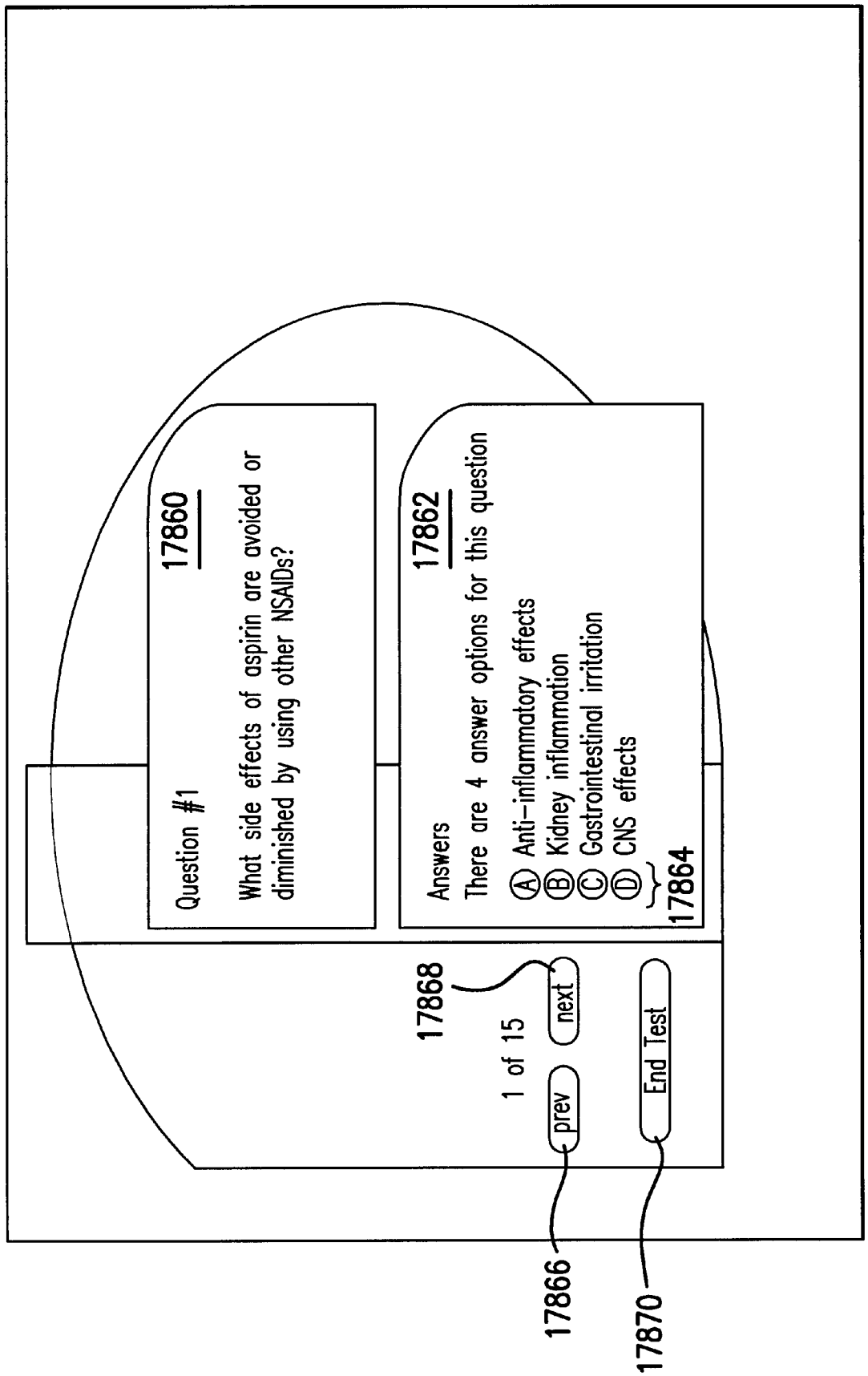

After the completion of each chapter of a course, the user can activate the post-test button 17814 which changes the view to FIG. 17G and administers a practice test of the chapter material. Questions are asked in the question window 17860 and can be traversed using previous button 17866 and next button 17868. The user enters his/her answers in answer box 17862 by selecting one of the answer buttons 17864. In an alternative embodiment of the present invention, the user types short answers in response to questions. New question and answer formats can be added to the application module by taking advantage of the updating procedure of the present invention. The new question format would be received in a transport cell and the handler manager 109 would install new objects which would change one or all of the model, view, and controller of the application module.

When the user is finished with the post-test, the user can activate the end test button 17870 and return to FIG. 17A. The results of the post-test can be placed in a transport cell in a transport cell list in the outgoing table 13550 of the local computer to be sent to the server for evaluation as well as other statistical information such as the length of time spent on certain questions. The server (or administrator) can also evaluate the responses to questions of many clients in order to determine if a particular question is flawed. The server can then send an update to all of the clients in order to replace the flawed question with a new question by placing the new question in its outgoing table.

The user can activate the final exam button 17816 (preferably after completion of all of the chapters of a course) which changes the view to FIG. 17H. Questions are asked in the question window 17872 and can be traversed using previous button 17880 and next button 17882. The user enters his/her answers in answer box 17874 by selecting one of the answer buttons 17876 during a predetermined time period displayed by a clock icon 17878. When the user is finished with the final exam, the user can activate the end test button 17886 and return to FIG. 17A. Alternatively, the user can select the quit button 17884 to quit the final exam without saving the results. The results of the final exam can be sent to the server for evaluation as well as other statistical information such as the length of time spent on certain questions.

After completion of any post-test or the final exam, the user can activate the score button 17818 and the view changes to FIG. 17H. The user can display the score results in different ways by selecting a display scheme from the display scheme window 17890. Examples of display schemes are score by topic, score by objective (text), and score by objective (graph). The scoring data is displayed in the score window 17888. When the user is finished viewing the score data, the user can activate the end score button 17892 and return to FIG. 17A.

Figure 17I:
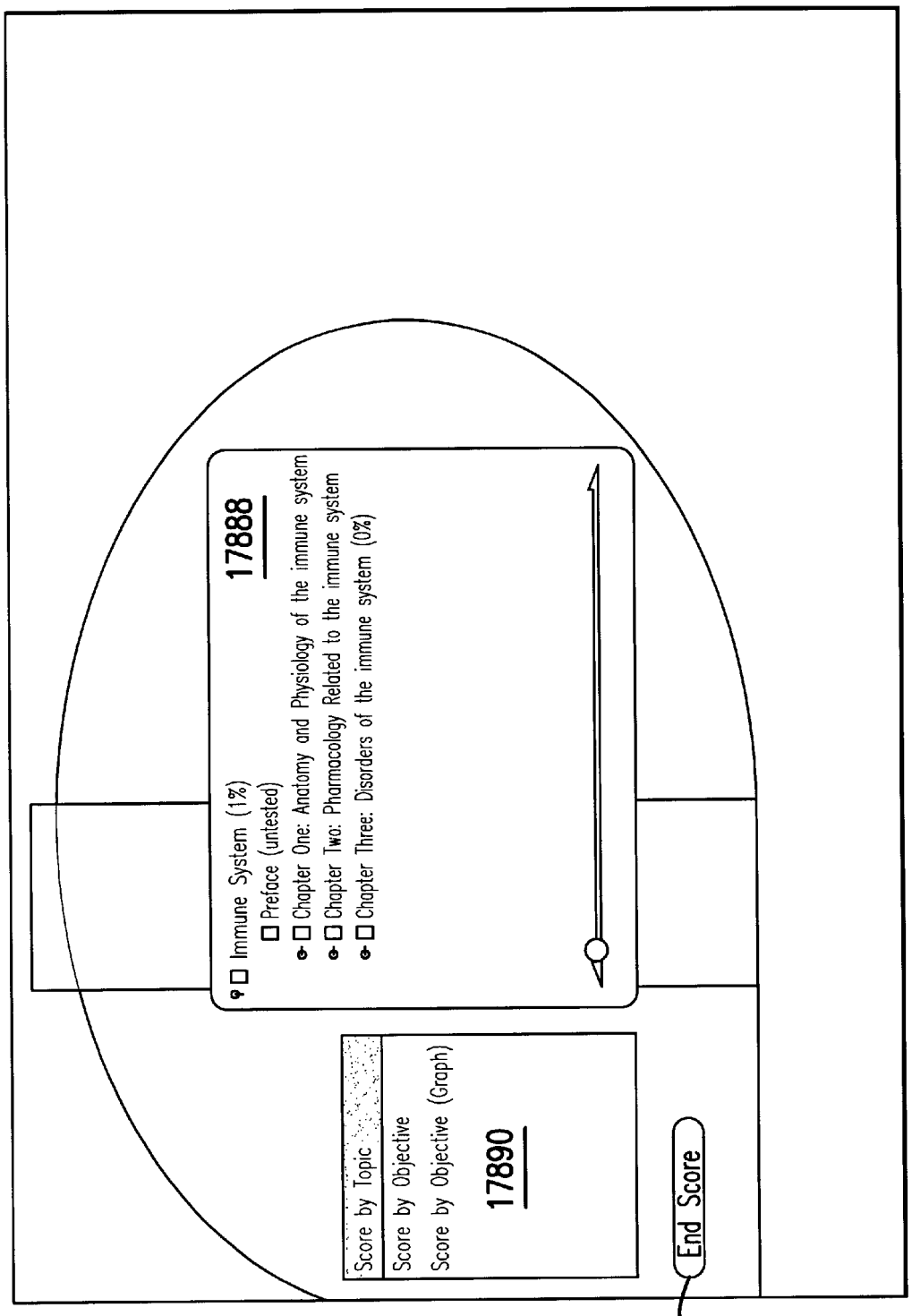
Figure 17J:
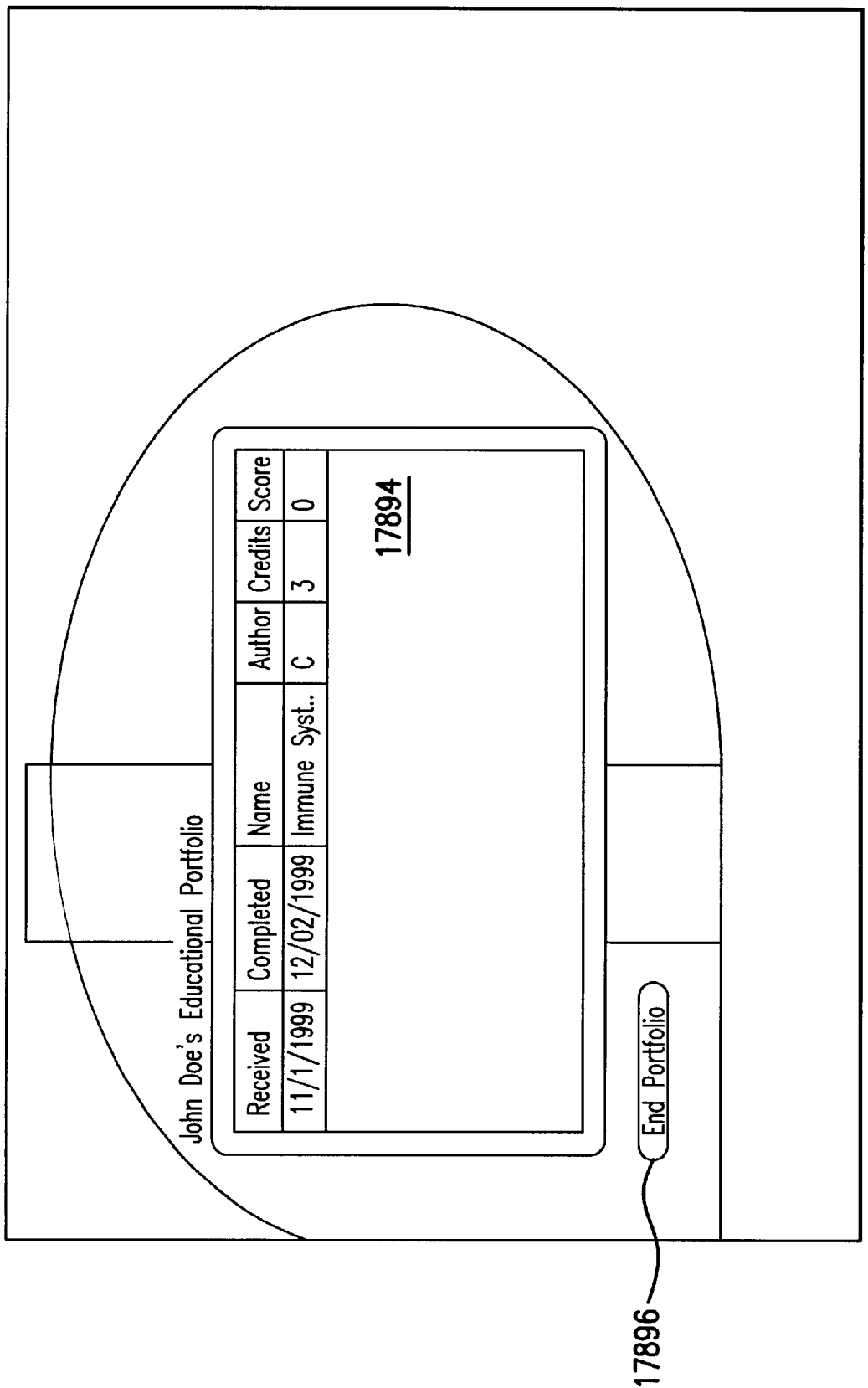

When the user activates the portfolio button 17820, the view changes to FIG. 17I. The portfolio window 17894 displays a list of the completed courses by the user. When the user is finished viewing the portfolio, the user can activate the end portfolio button 17896 and return to FIG. 17A.

The user can also have an electronic mailbox which can be activated by mailbox button 17822. The mailbox feature can have its own display and send mail through the update procedure of the present invention. When the user wishes to exit the application module, the user selects the quit button 17824 in FIG. 17A.

While the above provides a full and complete disclosure of various embodiments of the present invention, various modifications, alternative constructions, and equivalents may be employed without departing from the true spirit and scope of the invention. Therefore, the above description and illustrations should not be construed as limiting the scope of the invention, which is defined by the appended claims.

We claim:

1. A method for exchanging application information between a server and a client computer, the server having access to a repository, the method comprising:

the server transmitting transport cell list information to the client computer;

the server receiving identified transfer information from the client computer, the identified transfer information including at least one object, wherein the identified transfer information includes information identified by comparing the transport cell list information with information stored on the client computer; and transmitting the identified transfer information to the client computer.

2. The method of claim 1, further comprising:

updating the repository using the identified transfer information.

3. The method of claim 1, wherein the server is coupled to the client computer via a network during receiving and transmitting.

4. The method of claim 3, wherein the network is the Internet.

5. The method of claim 3, further comprising:

disconnecting the client computer from the network following transmitting the identified update information to the client computer.

6. The method of claim 1, wherein the at least one object includes an application capable of running on the client computer.

7. The method of claim 1, wherein the at least one object includes an application update for an application capable of running on the client computer.

8. The method of claim 1, wherein the transport cell list information comprise a history table received from the client computer.

9. The method of claim 2, wherein the data received from the client computer includes identification information, the method further including:

verifying the identification information for the client computer.

10. The method of claim 9, wherein the repository includes data associated with the identification information for the client computer.

11. The method of claim 1, further comprising:

the server storing the transport cell list information.

12. The method of claim 11, wherein the client computer transport cell list information is stored in the repository.

13. The method of claim 1, wherein the server receives the transport cell list information from the client computer via a gateway.

14. The method of claim 1, wherein the server comprises a computer.

15. The method of claim 1, wherein the repository comprises a database.

16. A system for exchanging application information, comprising:

a server coupled to a network;

a database accessible by the server; and a client computer coupleable to the server via the network;

wherein the server transmits transport cell list information to the client computer;

wherein the server receives identified transfer information from the client computer, the identified transfer information including at least one object, wherein the identified transfer information includes information identified by comparing the transport cell list information with information stored on the client computer; and wherein the server transmits the identified transfer information to the client computer.

17. The system of claim 16, wherein the network is the Internet.

18. A system for exchanging application information between a server and a client computer, the server having an accessible database, the system comprising:

means for the server transmitting transport cell list information to the client computer;

means for the server receiving identified transfer information from the client computer, the identified transfer information including at least one object, wherein the identified transfer information includes information identified by comparing the transport cell list information with information stored on the client computer; and means for transmitting the identified transfer information to the client computer.

19. A method for updating a computer system the computer system including a first computer and a second computer, the method comprising:

receiving, by the first computer, at least one transport cell list identification from the second computer;

comparing, by the first computer, the at least one transport cell list identification with at least one identification stored on the first computer;

sending, by the second computer to the first computer, all transport cell lists which are not stored on the first computer, wherein the transport cell list includes at least one transport cell, and wherein each of the at least on transport cell list includes at least one object.

20. The method of claim 19, further comprising:

connecting the first computer to the second computer.

21. The method of claim 19, further comprising:

authenticating the first computer to the second computer.

22. A method for updating a computer system, said computer system including a first computer and a second computer, said method comprising the steps of:

connecting said first computer to said second computer;

authenticating said first computer to said second computer;

receiving, by said first computer, at least one transport cell list identification from said second computer;

comparing, by said first computer, said at least one transport cell list identification with at least one identification stored on said first computer;

sending, by said second computer to said first computer, all transport cell lists which are not stored on said first computer, wherein said transport cell list includes at least one transport cell and wherein each of said at least one transport cell list includes at least one object.

23. The method of claim 22 further comprising the steps of:

receiving, by said second computer, another at least one transport cell list identification from said first computer;

comparing, by said second computer, said another at least one transport cell with at least one identification stored on said second computer;

sending, by said firs computer to said second computer, all transport cell lists which are not stored on said second computer, wherein said transport cell list includes at least one transport cell and wherein each of said at least one transport cell list includes at least one object.

* * * * *